US012559613B2

(12) United States Patent
Zhang et al.

(10) Patent No.: US 12,559,613 B2
(45) Date of Patent: Feb. 24, 2026

(54) HYDROSILYLATION CURE OF ELASTOMERS

(71) Applicant: DOW GLOBAL TECHNOLOGIES LLC, Midland, MI (US)

(72) Inventors: Kainan Zhang, Shanghai (CN); Hongyu Chen, Shanghai (CN); Tao Han, Shanghai (CN); Xiaomei Song, Shanghai (CN); Jie Ji, Shanghai (CN); Linfei Wang, Shanghai (CN); Chao He, Shanghai (CN); Xin Tan, Shanghai (CN)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 510 days.

(21) Appl. No.: 18/017,664

(22) PCT Filed: Jul. 22, 2020

(86) PCT No.: PCT/CN2020/103433

§ 371 (c)(1),
(2) Date: Jan. 23, 2023

(87) PCT Pub. No.: WO2022/016408

PCT Pub. Date: Jan. 27, 2022

(65) Prior Publication Data

US 2023/0272201 A1 Aug. 31, 2023

(51) Int. Cl.
*C08L 23/16* (2006.01)
*C08K 3/36* (2006.01)
*C08K 9/06* (2006.01)

(52) U.S. Cl.
CPC ................ *C08L 23/16* (2013.01); *C08K 3/36* (2013.01); *C08K 9/06* (2013.01)

(58) Field of Classification Search
CPC .............. C08L 23/16; C08K 3/36; C08K 9/06
USPC .......................................................... 523/206
See application file for complete search history.

(56) References Cited

U.S. PATENT DOCUMENTS

| | | | |
|---|---|---|---|
| 5,936,028 A | 8/1999 | Medsker et al. | |
| 6,150,464 A | 11/2000 | Medsker et al. | |
| 6,251,998 B1 | 6/2001 | Medsker et al. | |
| 6,342,324 B1 * | 1/2002 | Li | C09D 183/04 430/66 |
| 6,476,132 B1 | 11/2002 | Abdou-Sabet et al. | |
| 6,864,315 B1 | 3/2005 | Akuta et al. | |
| 7,741,394 B2 | 6/2010 | Hakuta et al. | |
| 2003/0013818 A1 | 1/2003 | Hakuta et al. | |
| 2003/0127239 A1 | 7/2003 | Fomperie | |
| 2005/0154132 A1 | 7/2005 | Hakuta et al. | |
| 2008/0114126 A1 | 5/2008 | Blok et al. | |
| 2009/0234057 A1 | 9/2009 | Adler et al. | |
| 2011/0123814 A1 | 5/2011 | Blok et al. | |
| 2016/0362576 A1 * | 12/2016 | Asanuma | H10F 19/80 |

FOREIGN PATENT DOCUMENTS

| | | |
|---|---|---|
| EP | 0310129 | 9/1991 |
| GB | 1118327 | 7/1968 |
| JP | 8003324 | 1/1996 |
| JP | 10212389 | 8/1998 |
| WO | 2008060749 A2 | 5/2008 |

OTHER PUBLICATIONS

Suhara et al., "Fine silica powder modified with quaternary ammonium groups: reactivity and characteristics", Colloids and Surfaces, pp. 1-4, 1995. (Year: 1995).*
Resin, Safety Data Sheet, 2014, pp. 1-7.
Office action from corresponding Chinese application: 2020801035463 dated Sep. 27, 2024.
Office Action from corresponding Japanese application: 2023-504621 dated Jul. 11, 2024.
Cray Valley, Riccon 130 Technical Data Sheet.
Ronbunshu, "Effects of Chemical Structure of Cross-linking Agent on the Cure Rate of EPDM by Hydrosilylation Reaction" 2007, vol. 64, No. 4, p. 204-214.
Ronbunshu, "Effects of Diene Structure of EPDM on the Cure Rate using Newly Developed Hydrosilylation Reaction" 2007, vol. 63, No. 4, p. 257-265.
Ronbunshu, "Properties of EPDM Cured by a Newly Developed Hydrosilylation Reaction" 2007, vol. 64, No. 4, p. 215-222.
Universal Selector, NISSO-PB B-1000 Technical Datasheet, 2019.
PCT/CN2020/103433, International Search Report and Written Opinion with a mailing date of Mar. 10, 2021.

* cited by examiner

*Primary Examiner* — Hannah J Pak

(57) ABSTRACT

A process to form a crosslinked composition, said process comprising thermally treating a composition comprising the following: a) an elastomer; b) a siloxy-modified silica; c) a hydrosilylation catalyst. A composition comprising the following: a) an elastomer; b) a siloxy-modified silica; c) a hydrosilylation catalyst.

16 Claims, No Drawings

HYDROSILYLATION CURE OF ELASTOMERS

BACKGROUND OF THE INVENTION

Cured rubber, such as EPDM, is used for automotive applications. Sulfur-cured EPDM produces high VOC (Volatile Organic Compounds) levels, which, in turn, create an odor in the final application. Governmental regulations to reduce VOC levels are becoming more stringent. Thus, there is a need for new curing processes and related compositions that reduce VOC and odor, associated with cured rubber formulations, and that maintain or improve cure properties.

U.S. Pat. No. 7,741,394 discloses a rubber composition containing the following: a specific ethylene/alpha-olefin/non-conjugated polyene copolymer, in which the non-conjugated polyene is a norbornene-based compound; a "SiH group-containing" compound; and optionally, an organopolysiloxane (see abstract). Surface treated fumed silica and precipitated silica may each be used as a rubber reinforcing agent. The silica may be surface treated with a reactive silane, such as hexamethyldisilazane, chlorosilane, alkoxysilane, or low-molecular weight siloxane (see column 17, lines 40-46).

U.S. Publication 2009/0234057 discloses a rubber composition, which contains the following: a rubber having at least two functional groups which can be crosslinked by hydrosilylation; a crosslinking agent; a hydrosilylation catalyst system; at least one filler; and a coagent, which can be crosslinked by hydrosilylation (see abstract). The crosslinking agent includes a hydrosiloxane or a hydrosiloxane derivative, or a mixture of several hydrosiloxanes or derivatives, and which include at least two SiH-groups per molecule in the center (see abstract). An example of a crosslinking agent is shown below:

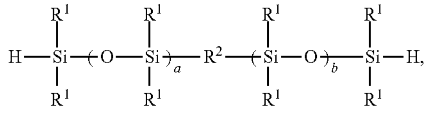

where $R^1$ is a saturated hydrocarbon group or an aromatic hydrocarbon group that is monovalent, and that has 1 to 10 carbon atoms, and that is substituted or unsubstituted; a is from 0 to 20; and b is from 0 to 20, and $R^2$ is a bivalent organic group having 1 to 30 carbon atoms or oxygen atoms (see paragraph [0028]). Fillers include a surface modified silicate (see paragraph [0035]).

U.S. Pat. No. 6,251,998 discloses the vulcanization of an elastomeric polymer blend, in the presence of a hydrosilylation agent and a hydrosilylation catalyst, and where the elastomer contains from about 40 to about 90 weight percent ethylene, and about 0.25 weight percent or more of vinyl norbornene, and has a Mooney Viscosity from 45 to 100 (see claim 1). The hydrosilylation agent is a silicon hydride compound having at least two SiH groups. Useful compounds include methylhydrogen polysiloxanes, methylhydrogen dimethylsiloxane copolymers, methylhydrogen alkyl methyl polysiloxanes, bis(dimethylsilyl)alkanes and bis(dimethylsilyl)benzene. See column 5, lines 23-35.

U.S. Pat. No. 5,936,028 discloses a process for the hydrosilylation crosslinking of a "diene-containing" elastomer by dynamic vulcanization, in the presence of an olefinic thermoplastic resin, a hydrosilylation agent, a platinum containing hydrosilylation catalyst, and an extender or processing oil (see claim 1). Preferred hydrosilylation agents are silicon hydride compounds described by the following formula:

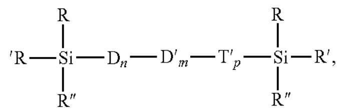

where D represents —(Si(R)(R)—O)—, D' represents —(Si(R)(H)—O)—, and T represents

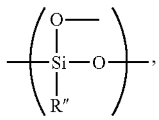

m is from 1 to 50, n is from 1 to 50, and p is from 0 to 6. Each R is independently selected from the group consisting of alkyls comprising 1 to 20 carbon atoms, cycloalkyls comprising 4 to 12 carbon atoms and aryls. R' represents a hydrogen atom, an alkyl or alkoxy group having from 1 to about 24 carbon atoms. R" represents R or a hydrogen atom. See column 3, line 18, to column 4, line 11. The elastomer may contain a filler, such as silica (see column 6, lines 47 to 65). See also U.S. Pat. Nos. 6,150,464 and 6,476,132.

U.S. Pat. No. 6,864,315 discloses a crosslinkable rubber composition that comprises the following: an ethylene/alpha-olefin/non-conjugated polyene random copolymer, comprising a specific vinyl end group-containing norbornene compound; a SiH group-containing compound having at least two SiH groups in one molecule; and optionally, an addition reaction catalyst comprising a platinum group element; and a reaction inhibitor (see abstract). The SiH group-containing compound, and resins manufactured, may be linear, cyclic, branched and three-dimensional network structures (see column 33, lines 38-49). Rubber reinforcing agents include silica that is surface treated with a reactive silane, such as hexamethyldisilazane, chlorosilane, alkoxysilane, or low-molecular weight siloxane (see column 44, lines 9-22).

Additional hydrosilylation reactions and polymer formulations are disclosed in the following: U.S. 2003/0127239; EP0310129A2; GB1118327A (abstract); JPH10212389A (machine translation); and JP8003324A (abstract); Journal of Polymer (Kobunshi Ronbunshu), 2007, 64(4), 204-214; Journal of Polymer (Kobunshi Ronbunshu), 2007, 64(4), 215-222; Journal of Polymer (Kobunshi Ronbunshu), 2006, 63(4), 257-265.

However, as discussed, there remains a need for new curing processes and related compositions that reduce VOC and odor, associated with cured rubber formulations, and that maintain or improve cure properties. These needs have been met by the following invention.

SUMMARY OF THE INVENTION

In a first aspect, a process to form a crosslinked composition, said process comprising thermally treating a composition comprising the following:

a) an elastomer;

b) a siloxy-modified silica;

c) a hydrosilylation catalyst.

In a second aspect, a composition comprising the following:

a) an elastomer;

b) a siloxy-modified silica;

c) a hydrosilylation catalyst.

DETAILED DESCRIPTION OF THE INVENTION

Hydrosilylation processes have been discovered that effectively crosslink compositions comprising an elastomer, a siloxy-modified silica and a hydrosilylation catalyst, and which result in reduce odor, as compared to a conventional sulfur cured composition. In general, the compositions showed an increase in the level of crosslinking, as indicated by the "MH-ML" differential, as compared to compositions containing other types of silane or siloxane compounds, and compared to the conventional sulfur-cured composition. It has also been discovered that the addition of certain polybutadienes helped to increase the "MH-ML" differential, indicating additional reactions occur.

A process to form a crosslinked composition is provided, as noted in the first aspect of the invention discussed above. Also, a composition is provided, as noted in the second aspect of the invention discussed above. The above process (first aspect) may comprise a combination of two or more embodiments, as described herein. The above composition (second aspect) may comprise a combination of two or more embodiments, as described herein. Each component a, b and c may comprise a combination of two or more embodiments, as described herein. The following embodiments apply to both the first and second aspects of the invention.

In one embodiment, or a combination of two or more embodiments, each described herein, the elastomer is selected from the following: i) an ethylene/alpha-olefin/nonconjugated polyene interpolymer; ii) a polyisoprene, iii) a polybutadiene, iv) a styrene butadiene rubber, v) a nitrile rubber, vi) a polychloroprene, vii) a butyl rubber, viii) a halogenated butyl rubber, or ix) a halogenated nitrile rubber, and further from the following: i) an ethylene/alpha-olefin/nonconjugated polyene interpolymer; ii) a polyisoprene, iii) a polybutadiene, iv) a styrene butadiene rubber, v) a nitrile rubber, and further from the following: i) an ethylene/alpha-olefin/nonconjugated polyene interpolymer.

In one embodiment, or a combination of two or more embodiments, each described herein, component b has a viscosity, at 25° C., ≤500 cSt, or ≤400 cSt, or ≤300 cSt, or ≤200 cSt, or ≤100 cSt, or ≤50 cSt, or ≤40 cSt. In one embodiment, or a combination of two or more embodiments, each described herein, component b has a viscosity, at 25° C., ≥0.5 cSt, or ≥1.0 cSt, or ≥1.5 cSt, or ≥2.0 cSt, or ≥2.5 cSt, or ≥3.0 cSt, or ≥3.5 cSt, or ≥4.0 cSt, or ≥4.5 cSt, or ≥5.0 cSt, or ≥6.0 cSt, or ≥8.0 cSt, or ≥10 cSt, or ≥12 cSt, or ≥14 cSt, or ≥16 cSt, or ≥18 cSt, or ≥20 cSt.

In one embodiment, or a combination of two or more embodiments, each described herein, the siloxy portion of the siloxy-modified silica (component b) comprises ≥4 units, or ≥6 units, or ≥8 units, or ≥10 units, or ≥15 units, or ≥20 units of the following Structure 1: ∿∿ O—Si($R^1$)($R^2$)H (Structure 1), where $R^1$ is a hydrocarbyl group, and $R^2$ is a hydrocarbyl group, and $R^1$ and $R^2$ may be the same or different. As used herein, R1=$R_1$, R2=$R_2$. In Structure 1, the wavy line "∿∿ " denotes an attachment (bond) between Structure 1 and the remainder of the siloxy-modified silica.

In one embodiment, or a combination of two or more embodiments, each described herein, the silica portion of the siloxy-modified silica is derived from a silica Q resin.

In one embodiment, or a combination of two or more embodiments, each described herein, the hydrosilylation catalyst comprises Pt, Pd, Rh, Re, Ir, Ru, or a mixture thereof, and further Pt.

In one embodiment, or a combination of two or more embodiments, each described herein, the composition further comprises a polybutadiene, and further a liquid (at 25° C., ambient atmosphere) polybutadiene. This polybutadiene is different (for example, lower Mn) from a polybutadiene elastomer of component a.

In one embodiment, or a combination of two or more embodiments, each described herein, the polybutadiene comprises ≥5.0 mol %, or ≥10 mol %, or ≥15 mol %, or ≥20 mol %, or ≥22 mol %, or ≥24 mol %, or ≥26 mol % of 1,2-vinyl content, based on the total moles of carbon-carbon double bond groups in the polybutadiene. In one embodiment, or a combination of two or more embodiments, each described herein, the polybutadiene comprises ≤50 mol %, or ≤45 mol %, or ≤40 mol %, or ≤38 mol %, or ≤36 mol %, or ≤34 mol %, or ≤32 mol %, or ≤30 mol % of 1,2-vinyl content, based on the total moles of carbon-carbon double bond groups in the polybutadiene. 1H NMR can be used to determine the 1,2-vinyl content. For example, using a BRUKER AVANCE 600 MHz spectrometer, equipped with a 10 mm C/H DUAL cryoprobe, and dissolving the polymer in tetrachloroethane-$d_2$ in an 8 mm NMR tube. One of ordinary skill in the art can determine the overall C—C double bond content and the 1,2-vinyl content from the NMR profile.

In one embodiment, or a combination of two or more embodiments, each described herein, the polybutadiene has a number average molecular weight (Mn) ≥500 g/mol, or ≥600 g/mol, or ≥700 g/mol, or ≥800 g/mol, or ≥900 g/mol, or ≥1,000 g/mol, or ≥1,200 g/mol, or ≥1,400 g/mol, or ≥1,600 g/mol, or ≥1,800 g/mol, or ≥2,000 g/mol. In one embodiment, or a combination of two or more embodiments, each described herein, the polybutadiene has a number average molecular weight (Mn) ≤10,000 g/mol, or ≤8,000 g/mol, or ≤6,000 g/mol, or ≤4,000 g/mol, or ≤3,000 g/mol.

In one embodiment, or a combination of two or more embodiments, each described herein, the elastomer of component a is an ethylene/alpha-olefin/nonconjugated polyene interpolymer, and further an EPDM. In one embodiment, or a combination of two or more embodiments, each described herein, the nonconjugated polyene of the ethylene/alpha-olefin/nonconjugated polyene interpolymer, and further an EPDM, is ENB.

In one embodiment, or a combination of two or more embodiments, each described herein, the composition is thermally treated at a temperature ≥90° C., or ≥100° C., or ≥110° C., or ≥120° C. In one embodiment, or a combination of two or more embodiments, each described herein, the composition is thermally treated at a temperature ≤220° C., or ≤210° C., or ≤200° C., or ≤190° C., or ≤180° C., or ≤170° C., or ≤160° C., or ≤150° C.

Also provided is a crosslinked composition formed from a process or a composition of any one embodiment, or a combination of two or more embodiments, each described herein. Also provided is an article formed from a composition of any one embodiment, or a combination of two or more embodiments, each described herein.

Elastomers

An elastomer is a polymer with a viscoelasticity (i.e., both viscosity and elasticity) property. As discussed above, an elastomer includes, but is not limited to, the following: an ethylene/alpha-olefin/nonconjugated polyene interpolymer; ii) a polyisoprene, iii) a polybutadiene, iv) a styrene butadiene rubber, v) a nitrile rubber, vi) a polychloroprene, vii) a butyl rubber, viii) a halogenated butyl rubber, and ix) a halogenated nitrile rubber.

The ethylene/alpha-olefin/nonconjugated polyene interpolymers, as described herein, comprises, in polymerize form, ethylene, an alpha-olefin, and a nonconjugated polyene. The alpha-olefin may be either an aliphatic or an aromatic compound. The alpha-olefin is preferably a C3-C20 aliphatic compound, preferably a C3-C16 aliphatic compound, and more preferably a C3-C10 aliphatic compound. In one embodiment, the interpolymer is an ethylene/propylene/nonconjugated diene interpolymer, and further a terpolymer. Suitable examples of nonconjugated polyenes include the C4-C40 nonconjugated dienes. In one embodiment, the polyene is a nonconjugated diene, and further selected from 5-ethylidene-2-norbornene (ENB), 5-vinyl-2-norbornene (VNB), dicyclopentadiene, 1,4-hexadiene, or 7-methyl-1,6-octadiene, and further from ENB, VNB, dicyclopentadiene or 1,4-hexadiene, and further from ENB or VNB, and further ENB.

Polyisoprenes include, for example, natural polyisoprene, such as cis-1,4-polyisoprene (natural rubber (NR) and trans-1,4-polyisoprene (gutta-percha); and synthetic polyisoprene (IR for isoprene rubber). Polybutadienes (or BR for butadiene rubber) include, for example, polymers of 1,3-butadiene. Polychloroprenes include, for example, polymers of chloroprene. Butyl rubbers include, for example, copolymers of isobutylene and isoprene (IIR). Halogenated butyl rubbers include, for example, chloro butyl rubbers (CIIR) and bromo butyl rubbers (BIIR). Styrene-butadiene rubbers include, for example, copolymers of styrene and butadiene (SBR). Nitrile rubbers include, for example, copolymers of butadiene and acrylonitrile (NBR).

Siloxy-Modified Silica

A siloxy-modified silica comprises a Q structure (see examples below) and at least three silane (Si—H) groups. A siloxy-modified silica may be represented by the formula as $Q_nM^H_m$ (see, for example, Schematic 1 below (here dimethylsilane groups)), where n≥2, or n≥3, or n≥4, or n≥6, or n≥8, or n≥10, or n≥15, or n≥20, and m≥3, or m≥4, or m≥6, or m≥8, or m≥10, or m≥15, or m≥20. This modified silica can also be referred to as an MQ resin. The $Q_n$ portion of this modified silica is a highly crosslinked structure, where the oxygen atoms are shared between each Q unit, and also between Q and M unit, when Q and M are connected. In one embodiment, the Q and M are connected.

Schematic 1

Q = 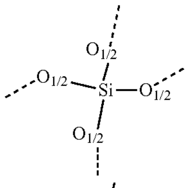

$M^H$ = 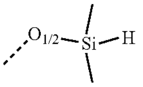 or = $O_{1/2}SiH(CH_3)_2$

Possible "$Q_nM^H_m$" structures include, but are not limited to, those shown in S1-S3 (there could be multiple of these, depends on the way the Q unit is combined, and there may also be hydroxyls on the Q unit), and S4-S5 (bridged, fused, or caged structures (3D type) or opened cages):

S1)

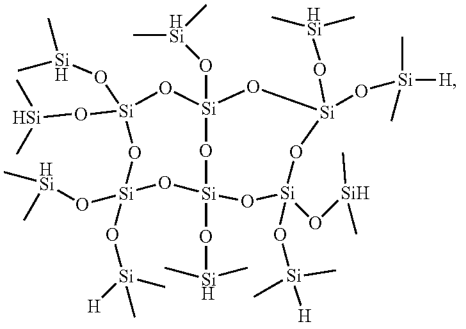

S2)

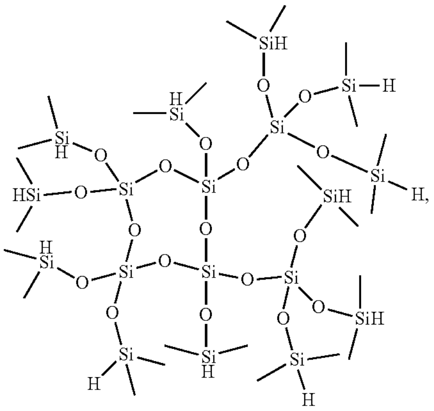

S3)

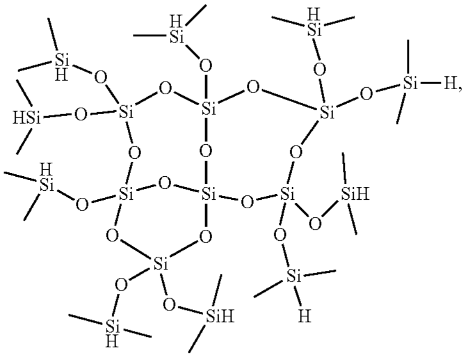

S4)

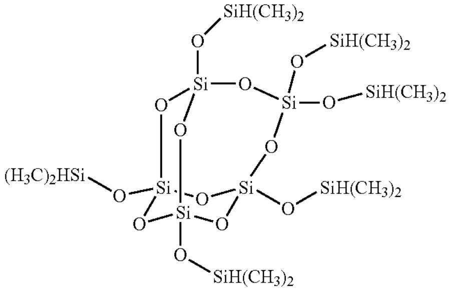

or

-continued

S5)

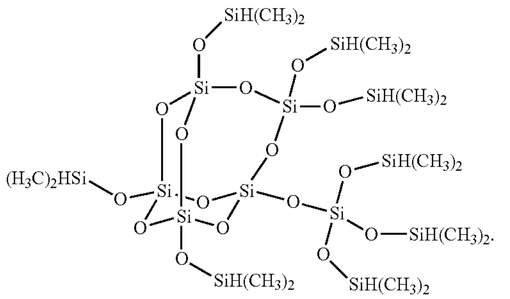

Another representation of a siloxy-modified silica is shown in Structure S6 below, showing several silane groups attached to a Q-resin, and where the Q-resin, as shown in Structure S7, is a condensated tetraoxysiloxane.

S6)

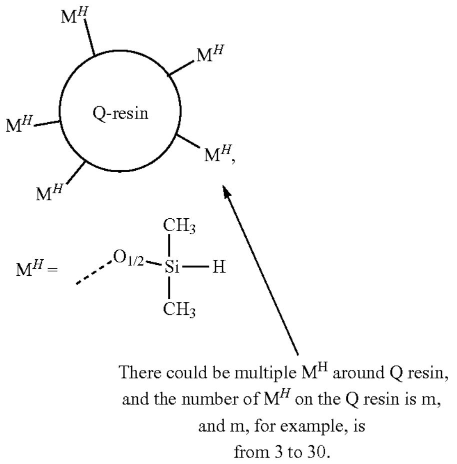

S7)

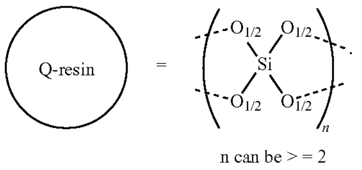

Structure S6 can be made by condensation of tetramethoxysilane (other name could be tetramethyl orthosilicate, CAS: 681-84-5) with 1,1,3,3-tetramethyldisiloxane (other name could be [(dimethylsilyl)oxy]dimethylsilane, CAS: 3277-26-7), under acidic aqueous conditions. Other methods to make Structure S6 include condensation between tetraalkoxysilane (or tetrachlorosilane or sodium silicate) with dimethylalkoxysilane (or dimethylchlorosilane). In Structure S7), n≥2, or n≥4, or n≥6, or n≥8, or n≥10, or n≥15, or n≥20, and, in Structure S6, m≥3, or m≥4, or m≥6, or m≥8, or m≥10, or m≥20.

Examples of siloxy-modified silicas include dimethylhydrogensiloxy modified silica (CAS: 102262-28-2) from the Dow Chemical Company, and HQM-105 and HQM-107, each from Gelest.

Hydrosilylation Catalyst

A hydrosilylation catalyst, as used herein, is a compound that accelerates the reaction between the siloxy-modified silica and the alkene groups on the elastomer. Suitable catalysts include catalysts based on platinum (Pt), or other metals such as Pd, Rh, Re, Ir, or Ru. In one embodiment, the metal, further Pt, is dissolved in a vinyl terminated PDMS. In one embodiment, the catalysts is Karstedt's catalyst (that is, platinum(0)-1,3-divinyl-1,1,3,3-tetramethyl-disiloxane complex solution). Karstedt's catalyst is available commercially (Sigma Aldrich) as a Pt solution in xylene, at 2 wt % Pt, based on the weight of the solution. In one embodiment, the catalyst comprises platinum, 1,3-diethenyl-1,1,3,3-tetramethyl-disiloxane complexes.

Additives

An inventive composition may comprise one or more additional additives. Suitable additives include, but are not limited to, fillers, oils, processing aids, stabilizers (for example, antioxidants, antiozonants, UV stabilizers), flame retardants, colorants or pigments, and combinations thereof. Fillers include, but are not limited to, carbon black; calcium carbonate; silicon oxide; aluminum oxide; kaolinite; montmorillonite; silicates of aluminum, magnesium, calcium; titanium dioxide; natural fibers; synthetic fibers; and the like. Oils include, but are not limited to, paraffinic oils, naphthenic oils and polyalkylbenzene oils. In one embodiment, the oil is selected from paraffinic oils, naphthenic oils, and combinations thereof. Stabilizers include, but are not limited to, hindered phenols, bisphenols, thiobis-phenols, and substituted hydroquinones. Typically, one or more stabilizers, in "ppm" amounts, are added to a polymer or a polymer composition. Processing aids include PEG 4000 or PEGs with a variety of molecular weights, fatty acids, Zn/Ca and Zn-free containing fatty acids. Calcium oxide may be used as desiccant.

Definitions

Unless stated to the contrary, implicit from the context, or customary in the art, all parts and percents are based on weight, and all test methods are current as of the filing date of this disclosure.

The term "composition," as used herein, includes a mixture of materials, which comprise the composition, as well as reaction products and decomposition products formed from the materials of the composition. Any reaction product or decomposition product is typically present in trace or residual amounts.

The term "polymer," as used herein, refers to a polymeric compound prepared by polymerizing monomers, whether of the same or a different type. The generic term polymer thus, includes the term homopolymer (employed to refer to polymers prepared from only one type of monomer, with the understanding that trace amounts of impurities can be incorporated into the polymer structure), and the term interpolymer as defined hereinafter. Trace amounts of impurities, such as catalyst residues, can be incorporated into and/or within the polymer. Typically, a polymer is stabilized with very low amounts ("ppm" amounts) of one or more stabilizers.

The term "interpolymer," as used herein, refers to polymer prepared by the polymerization of at least two different types of monomers. The term interpolymer thus includes the term copolymer (employed to refer to polymers prepared from two different types of monomers) and polymers prepared from more than two different types of monomers.

The term "olefin-based polymer," as used herein, refers to a polymer that comprises, in polymerized form, 50 wt % or a majority weight percent of an olefin, such as ethylene or propylene (based on the weight of the polymer), and optionally may comprise one or more comonomers.

The term "propylene-based polymer," as used herein, refers to a polymer that comprises, in polymerized form, a majority weight percent of propylene (based on the weight of the polymer), and optionally may comprise one or more comonomers.

The term "ethylene-based polymer," as used herein, refers to a polymer that comprises, in polymerized form, 50 wt % or a majority weight percent of ethylene (based on the weight of the polymer), and optionally may comprise one or more comonomers.

The term "ethylene/alpha-olefin interpolymer," as used herein, refers to a random interpolymer that comprises, in polymerized form, 50 wt % or a majority weight percent of ethylene (based on the weight of the interpolymer), and an alpha-olefin.

The term "ethylene/alpha-olefin/nonconjugated polyene interpolymer," as used herein, refers to an interpolymer that comprises, in polymerized form, ethylene, an alpha-olefin, and a nonconjugated polyene. In one embodiment, the "ethylene/alpha-olefin/nonconjugated polyene interpolymer," comprises, in polymerized form, 50 wt % or a majority weight percent of ethylene (based on the weight of the interpolymer). The term "ethylene/alpha-olefin/nonconjugated diene interpolymer," as used herein, refers to an interpolymer that comprises, in polymerized form, ethylene, an alpha-olefin, and a nonconjugated diene. In one embodiment, the "ethylene/alpha-olefin/nonconjugated diene interpolymer," comprises, in polymerized form, 50 wt % or a majority weight percent of ethylene (based on the weight of the interpolymer). Note, the terms "ethylene/alpha-olefin/nonconjugated polyene terpolymer" and "ethylene/alpha-olefin/nonconjugated diene terpolymer" are similarly defined; however, for each, the terpolymer comprises, in polymerized form, ethylene, the alpha-olefin and the polyene (or diene) as the only three monomer types.

The term, "ethylene/alpha-olefin copolymer," as used herein, refers to a random copolymer that comprises, in polymerized form, 50 wt % or a majority amount of ethylene monomer (based on the weight of the copolymer), and an alpha-olefin, as the only two monomer types.

The term "crosslinked composition," as used herein, refers to a composition that has a network structure due to the formation of chemical bonds between polymer chains. The formation of this network structure can be indicated by the increase in the "MH-ML" differential, as discussed herein.

The terms "thermally treating," "thermal treatment," and similar terms, as used herein, in reference to a composition comprising an elastomer, refer to the application of heat to the composition. Heat may be applied by conduction (for example, a heating coil), by convection (for example, heat transfer through a fluid, such as water or air), and/or by radiation (for example, heat transfer using electromagnetic waves). Preferably heat is applied by conduction and/or convection. Note, the temperature at which the thermal treatment takes place, refers to the internal temperature of the oven or other device, such as an MDR device (or tunnel), used to cure (or crosslink) the elastomer. Typically, the composition readily equilibrates (less than 30 seconds) to the temperature of the oven or device.

The phrase "a majority weight percent," as used herein, in reference to a polymer (or interpolymer or terpolymer or copolymer), refers to the amount of monomer present in the greatest amount in the polymer.

The terms "hydrocarbon group," "hydrocarbyl group," and similar terms, as used herein, refer to a chemical group containing only carbon and hydrogen atoms.

The terms "comprising," "including," "having," and their derivatives, are not intended to exclude the presence of any additional component, step or procedure, whether the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure, not specifically delineated or listed.

Listing of Some Process and Composition Features

A] A process to form a crosslinked composition, said process comprising thermally treating a composition comprising the following:

a) an elastomer;

b) a siloxy-modified silica;

c) a hydrosilylation catalyst.

B] The process of A] above, wherein the elastomer is selected from the following: i) an ethylene/alpha-olefin/nonconjugated polyene interpolymer; ii) a polyisoprene, iii) a polybutadiene, iv) a styrene butadiene rubber, v) a nitrile rubber, vi) a polychloroprene, vii) a butyl rubber, viii) a halogenated butyl rubber, or ix) a halogenated nitrile rubber, and further from the following: i) an ethylene/alpha-olefin/nonconjugated polyene interpolymer; ii) a polyisoprene, iii) a polybutadiene, iv) a styrene butadiene rubber, v) a nitrile rubber, and further from i) an ethylene/alpha-olefin/nonconjugated polyene interpolymer.

C] The process of A] or B] above, wherein the siloxy portion of the siloxy-modified silica (component b) comprises ≥4 units, or ≥6 units, or ≥8 units, or ≥10 units, or ≥15 units, or ≥20 units of the following Structure 1:

∿∿ O—Si($R^1$)($R^2$)H (Structure 1), where $R^1$ is a hydrocarbyl group, and $R^2$ is a hydrocarbyl group, and $R^1$ and $R^2$ may be the same or different.

D] The process of C] above, wherein $R^1$ is an alkyl, or a C1-C5 alkyl, or a C1-C4 alkyl, or a C1-C3 alkyl, or a C1-C2 alkyl, or methyl, and $R^2$ is an alkyl, or a C1-C5 alkyl, or a C1-C4 alkyl, or a C1-C3 alkyl, or a C1-C2 alkyl, or methyl.

E] The process of any one of A]-D] (A] through D]) above, wherein component b has a viscosity, at 25° C., ≤500 cSt, or ≤400 cSt, or ≤300 cSt, or ≤200 cSt, or ≤100 cSt, or ≤50 cSt, or ≤40 cSt.

F] The process of any one of A]-E] above, wherein component b has a viscosity, at 25° C., ≥0.5 cSt, or ≥1.0 cSt, or ≥1.5 cSt, or ≥2.0 cSt, or ≥2.5 cSt, or ≥3.0 cSt, or ≥3.5 cSt, or ≥4.0 cSt, or ≥4.5 cSt, or ≥5.0 cSt, or ≥6.0 cSt, or ≥8.0 cSt, or ≥10 cSt, or ≥12 cSt, or ≥14 cSt, or ≥16 cSt, or ≥18 cSt, or ≥20 cSt.

G] The process of any one of A]-F] above, wherein the silica portion of the siloxy-modified silica (component b) is derived from a silica Q resin.

H] The process of any one of A]-G] above, wherein the siloxy-modified silica comprises the following structure: $Q_nM^H{}_m$, as described above, and n≥2, or n≥3, or n≥4, or n≥6, or n≥8, or n≥10, or n≥15, or n≥20, and m≥3, or m≥4, or m≥6, or m≥8, or m≥10, or m≥15, or m≥20.

I] The process of H] above, wherein n≤1,000, or n≤500, or n≤200, or n≤100, and m≤1,000, or m≤500, or m≤200, or m≤100.

J] The process of any one of A]-I] above, wherein the siloxy-modified silica comprises the structure selected from S6, as described above, and where the Q-resin of structure S6 is selected from S7, as described above, and for Structure S7, n≥2, or n≥4, or n≥6, or n≥8, or n≥10, or n≥15, or n≥20, and for structure S6, m≥3, or m≥4, or m≥6, or m≥8, or m≥10, or m≥20.

K] The process of J] above, wherein n≤1,000, or n≤500, or n≤200, or n≤100, and m≤1,000, or m≤500, or m≤200, or m≤100.

L] The process of any one of A]-J] above, wherein the siloxy-modified silica comprises the structure selected from the following S1, S2, S3, S4, S5, or any combination thereof, and where each of S1, S2, S3, S4 and S5 is described above.

M] The process of any one of A]-L] above, wherein the hydrosilylation catalyst comprises Pt, Pd, Rh, Re, Ir, Ru, or a mixture thereof, and further Pt.

N] The process of any one of A]-M] above, wherein the elastomer (component a) is an ethylene/alpha-olefin/non-conjugated polyene interpolymer, further an ethylene/alpha-olefin/nonconjugated diene interpolymer, and further an ethylene/alpha-olefin/nonconjugated diene terpolymer.

O] The process of any one of A]-N] above, wherein the composition comprises ≥5.0 wt %, or ≥8.0 wt %, or ≥10.0 wt %, or ≥12.0 wt %, or ≥14.0 wt %, or ≥16.0 wt %, or ≥18.0 wt %, or ≥20.0 wt %, or ≥22.0 wt %, or ≥24.0 wt %, or ≥26.0 wt % of component a based on the weight of the composition.

P] The process of any one of A]-O] above, wherein the composition comprises ≤100.0 wt %, or ≤90.0 wt %, or ≤80.0 wt %, or ≤70.0 wt %, or 60.0 wt %, ≤50.0 wt %, or ≤40.0 wt %, or ≤35.0 wt %, or 30.0 wt % of component a based on the weight of the composition.

Q] The process of any one of A]-P] above, wherein the weight ratio of component a to component b is ≥5.0, or ≥5.5, or ≥6.0, or ≥6.5, or ≥7.0, or ≥7.5, or ≥8.0.

R] The process of any one of A]-Q] above, wherein the weight ratio of component a to component b is ≤80, or ≤70, or ≤60, or ≤50, or ≤40, or ≤35, or ≤30, or ≤25, or ≤20.

S] The process of any one of A]-R] above, wherein the weight ratio of component a to component c is ≥15, or ≥20, or ≥25, or ≥30, or ≥35, or ≥40.

T] The process of any one of A]-S] above, wherein the weight ratio of component a to component c is ≤50,000, or ≤10,000, or ≤5,000, or ≤1,000, or ≤800, or ≤600, or ≤400, or ≤200, or ≤150, or ≤100, or ≤90, or ≤80, or ≤60, or ≤55, or ≤50, or ≤45.

U] The process of any one of A]-T] above, wherein the weight ratio of component b to component c is ≥0.10, or ≥0.50, or ≥1.0, or ≥1.5, or ≥2.0, or ≥2.2, or ≥2.4, or ≥2.6.

V] The process of any one of A]-U] above, wherein the weight ratio of component b to component c is ≤3000, or ≤2000, or ≤1500, or ≤1000, or ≤500, or ≤200, or ≤100, or ≤40, or ≤30, or ≤20, or ≤10, or ≤9.0, or ≤8.0, or ≤7.0, or ≤6.0, or ≤5.5, or ≤5.0, or ≤4.5.

W] The process of any one of A]-V] above, wherein the composition comprises ≥0.20 wt %, or ≥0.30 wt %, or ≥0.40 wt %, or ≥0.60 wt %, or ≥0.80 wt %, or ≥1.0 wt %, or ≥1.1 wt %, or ≥1.2 wt %, or ≥1.4 wt %, or ≥1.6 wt % of component b based on the weight of the composition.

X] The process of any one of A]-W] above, wherein the composition comprises ≤8.0 wt %, ≤6.0 wt %, or ≤5.0 wt %, ≤4.5 wt %, or ≤4.0 wt %, or ≤3.8 wt %, or ≤3.6 wt %, ≤3.4 wt %, or ≤3.2 wt %, or ≤3.0 wt %, or ≤2.8 wt %, or ≤2.6 wt % of component b based on the weight of the composition.

Y] The process of any one of A]-X] above, wherein the composition comprises ≥0.10 wt %, or ≥0.15 wt %, or ≥0.20 wt %, or ≥0.22 wt %, or ≥0.24 wt %, or ≥0.26 wt %, or ≥0.28 wt %, or ≥0.30 wt %, or ≥0.35 wt %, or ≥0.40 wt %, or ≥0.45 wt % to ≤1.00 wt %, or ≤0.90 wt %, or ≤0.80 wt %, or ≤0.70 wt %, or ≤0.65 wt %, ≤0.60 wt %, or ≤0.58 wt %, or ≤0.56 wt % of component c, based on the weight of the composition.

Z] The process of any one of A]-Y] above, wherein the composition comprises ≥0.0005 wt %, or ≥0.0006 wt %, or ≥0.0008 wt %, or ≥0.0010 wt %, to ≤0.0100 wt %, or ≤0.0090 wt %, or ≤0.0080 wt %, or ≤0.0070 wt %, or ≤0.0060 wt %, ≤0.0050 wt % of a metal component of component c, based on the weight of the composition. In a further embodiment, the metal component is selected from Pt, Pd, Rh, Re, Ir, Ru, or a mixture thereof, and further Pt.

A2] The process of any one of A]-Z] above, wherein the composition further comprises at least one filler, further at least two fillers.

B2] The process of any one of A]-A2] above, wherein the composition further comprises a first filler and a second filler.

C2] The process of B2] above, wherein the weight ratio of the first filler to the second filler is ≥1.0, or ≥1.5, or ≥1.8, or ≥2.0.

D2] The process of B2] or C2] above, wherein the weight ratio of the first filler to the second filler is ≤5.0, or ≤4.5, or ≤4.0, or ≤3.5, or ≤3.0.

E2] The process of any one of B2]-D2] above, wherein the first filler is carbon black.

F2] The process of any one of B2]-E2] above, wherein the second filler is an oxide, a carbonate, or a combination thereof, and further a metal carbonate.

G2] The process of any one of A2]-F2] above, wherein the weight ratio of the sum of the filler(s) to component a is ≥1.0, or ≥1.2, or ≥1.4, or ≥1.6, or ≥1.8, or ≥2.0, or ≥2.2.

H2] The process of any one of A2]-G2] above, wherein the weight ratio of the sum of the filler(s) to component a is ≤4.0, or ≤3.5, or ≤3.0, or ≤2.8, or ≤2.6, or ≤2.4.

I2] The process of any one of A]-H2] above, wherein the composition further comprises a polybutadiene, and further a liquid (at 25° C., ambient atmosphere) polybutadiene. This polybutadiene is different (for example, lower Mn) from a polybutadiene elastomer of component a.

J2] The process I2] above, wherein the composition comprises ≥0.20 wt %, or ≥0.25 wt %, or ≥0.30 wt %, or ≥0.35 wt %, or ≥0.40 wt %, or ≥0.42 wt %, or ≥0.45 wt % of the polybutadiene based on the weight of the composition.

K2] The process of I2] or J2] above, wherein the composition comprises ≤5.0 wt %, ≤4.5 wt %, or ≤4.0 wt %, or ≤3.5 wt %, or 3.0 wt %, ≤2.5 wt %, or ≤2.0 wt %, of the polybutadiene based on the weight of the composition.

L2] The process of any one of I2]-K2] above, wherein the polybutadiene comprises ≥5.0 mol %, or ≥10 mol %, or ≥15 mol %, or ≥20 mol %, or ≥22 mol %, or ≥24 mol %, or ≥26 mol % of 1,2-vinyl content, based on the total moles of carbon-carbon double bond groups in the polybutadiene.

M2] The process of any one of I2]-L2] above, wherein the polybutadiene comprises ≤50 mol %, or ≤45 mol %, or ≤40 mol %, or ≤38 mol %, or ≤36 mol %, or ≤34 mol %, or ≤32 mol %, or ≤30 mol % of 1,2-vinyl content, based on the total moles of carbon-carbon double bond groups in the polybutadiene.

N2] The process of any one of I2]-M2] above, wherein the polybutadiene has a number average molecular weight (Mn) ≥500 g/mol, or ≥600 g/mol, or ≥700 g/mol, or ≥800 g/mol, or ≥900 g/mol, or ≥1,000 g/mol, or ≥1,200 g/mol, or ≥1,400 g/mol, or ≥1,600 g/mol, or ≥1,800 g/mol, or ≥2,000 g/mol.

O2] The process of any one of I2]-N2] above, wherein the polybutadiene has a number average molecular weight (Mn) ≤10,000 g/mol, or ≤8,000 g/mol, or ≤6,000 g/mol, or ≤4,000 g/mol, or ≤3,000 g/mol.

P2] The process of any one of A]-O2] above, wherein component a is an EPDM.

Q2] The process of any one of N]-P2] above, wherein the nonconjugated polyene of the interpolymer (component a) is ENB.

R2] The process of any one of N]-Q2] above, wherein the interpolymer (component a) comprises, in polymerized form, ≥0.5 wt %, or ≥0.7 wt %, or ≥1.0 wt %, or ≥1.5 wt %, or ≥2.0 wt %, or ≥2.5 wt %, or ≥3.0 wt %, or ≥3.5 wt %, or ≥4.0 wt %, or ≥4.5 wt % of ENB, based on the weight of the interpolymer.

S2] The process of any one of N]-R2] above, wherein the interpolymer (component a) comprises, in polymerized form, ≤7.0 wt %, or ≤6.8 wt %, or ≤6.5 wt %, or ≤6.2 wt %, or ≤6.0 wt %, or ≤5.8 wt %, or ≤5.6 wt % of ENB, based on the weight of the interpolymer.

T2] The process of any one of N]-S2] above, wherein the interpolymer (component a) comprises, in polymerized form, ≥50.0 wt %, or ≥52.0 wt %, or ≥55.0 wt %, or ≥58.0 wt %, or ≥60.0 wt %, or ≥62.0 wt % of C2 (ethylene), based on the weight of the interpolymer.

U2] The process of any one of N]-T2] above, wherein the interpolymer (component a) comprises, in polymerized form, ≤84.0 wt %, or ≤82.0 wt %, or ≤80.0 wt %, or ≤78.0 wt %, or ≤76.0 wt %, or ≤74.0 wt % of C2 (ethylene), based on the weight of the interpolymer.

V2] The process of any one of N]-U2] above, wherein the interpolymer (component a) comprises, in polymerized form, ≥10 wt %, or ≥12 wt %, or ≥15 wt %, or ≥18 wt %, or ≥20 wt %, or ≥22 wt %, or ≥24 wt % of the alpha-olefin, based on the weight of the interpolymer.

W2] The process of any one of N]-V2] above, wherein the interpolymer (component a) comprises, in polymerized form, ≤40 wt %, or ≤38 wt %, or ≤35 wt %, or ≤32 wt %, or ≤30 wt % of the alpha-olefin, based on the weight of the interpolymer.

X2] The process of any one of N]-W2] above, wherein the alpha-olefin of the interpolymer (component a) is a C3-C20 alpha-olefin, and further a C3-C10 alpha-olefin, and further propylene, 1-butene, 1-hexene or 1-octene, and further propylene, 1-butene, or 1-octene, and further propylene or 1-octene, further propylene.

Y2] The process of any one of A]-X2] above, wherein the composition comprises ≤1.0 wt, or ≤0.5 wt %, or ≤0.05 wt %, or ≤0.01 wt % of a solvent (a substance (typically a liquid at 25° C., ambient atmosphere) that dissolves at least components a through c), based on the weight of the composition.

Z2] The process of any one of A]-Y2] above, wherein the composition does not comprise a solvent.

A3] The process of any one of A]-Z2] above, wherein component a has a Mooney Viscosity (ML1+4 at 125° C.) ≥15, or ≥20, or ≥25, or ≥30, or ≥35, or ≥40, or ≥45, or ≥50, or ≥55.

B3] The process of any one of A]-A3] above, wherein component a has a Mooney Viscosity (ML1+4 at 125° C.) ≤90, or ≤85, or ≤80, or ≤78, or ≤75, or ≤72.

C3] The process of any one of A]-B3] above, wherein component a has a % crystallinity ≥0%, or ≥0.5%, or ≥1.0%, or 2.0%, or ≥3.0%, or ≥4.0%.

D3] The process of any one of A]-C3] above, wherein component a has a % crystallinity ≤50%, ≤45%, or ≤40%, ≤35%, or ≤30%, ≤28%, or ≤25%, ≤22%, or ≤20%, or ≤18%, ≤16%, or ≤14%, or ≤13%, or ≤12%.

E3] The process of any one of A]-D3] above, wherein component a has a density ≥0.860, or ≥0.865, or ≥0.870, or ≥0.872, or ≥0.874, or ≥0.876, or ≥0.878, or ≥0.880 g/cc (1 cc=1 $cm^3$).

F3] The process of any one of A]-E3] above, wherein component a has a density ≤0.950, or ≤0.940, or ≤0.930, or ≤0.920, or ≤0.910, or ≤0.905, or ≤0.900, or ≤0.890 g/cc.

G3] The process of any one of A]-F3] above, wherein the composition further comprises an oil.

H3] The process of any one of A]-G3] above, wherein the composition comprises ≥10.0 wt %, or ≥12.0 wt %, or ≥14.0 wt %, or ≥16.0 wt %, or ≥18.0 wt %, or ≥20.0 wt % of the sum of components a, b and c, based on the weight of the composition.

I3] The process of any one of A]-H3] above, wherein the composition comprises ≤100.0 wt %, or ≤90.0 wt %, or ≤80.0 wt %, or ≤70.0 wt %, or ≤60.0 wt %, or ≤50.0 wt %, or ≤40.0 wt %, or ≤38.0 wt %, or ≤36.0 wt %, or ≤34.0 wt %, or ≤32.0 wt %, or ≤30.0 wt %, or ≤28.0 wt %, or ≤26.0 wt %, or ≤24.0 wt % of the sum of components a, b and c, based on the weight of the composition.

J3] The process of any one of A]-I3] above, wherein the composition is thermally treated at a temperature ≥90° C., or ≥100° C., or ≥110° C., or ≥120° C.

K3] The process of any one of A]-J3] above, wherein the composition is thermally treated at a temperature ≤220° C., or ≤210° C., or ≤200° C., or ≤190° C., or ≤180° C., or ≤170° C., or ≤160° C., or ≤150° C.

L3] A crosslinked composition formed from the process of any one of A]-K3] above.

M3] An article comprising at least one component formed from the composition of L3] above.

A4] A composition comprising the following:
a) an elastomer;
b) a siloxy-modified silica;
c) a hydrosilylation catalyst.

B4] The composition of A4] above, wherein the elastomer is selected from the following: i) an ethylene/alpha-olefin/nonconjugated polyene interpolymer; ii) a polyisoprene, iii) a polybutadiene, iv) a styrene butadiene rubber, v) a nitrile rubber, vi) a polychloroprene, vii) a butyl rubber, viii) a halogenated butyl rubber, or ix) a halogenated nitrile rubber, and further from the following: i) an ethylene/alpha-olefin/nonconjugated polyene interpolymer; ii) a polyisoprene, iii) a polybutadiene, iv) a styrene butadiene rubber, v) a nitrile rubber, and further from i) an ethylene/alpha-olefin/nonconjugated polyene interpolymer.

C4] The composition of A4] or B4] above, wherein the siloxy portion of the siloxy-modified silica (component b) comprises ≥4 units, or ≥6 units, or ≥8 units, or ≥10 units, or ≥15 units, or ≥20 units of the following Structure 1:

∿∿ O—Si($R^1$)($R^2$)H (Structure 1), where $R^1$ is a hydrocarbyl group, and $R^2$ is a hydrocarbyl group, and $R^1$ and $R^2$ may be the same or different.

D4] The composition of C4] above, wherein $R^1$ is an alkyl, or a C1-C5 alkyl, or a C1-C4 alkyl, or a C1-C3 alkyl, or a C1-C2 alkyl, or methyl, and $R^2$ is an alkyl, or a C1-C5 alkyl, or a C1-C4 alkyl, or a C1-C3 alkyl, or a C1-C2 alkyl, or methyl.

E4] The composition of any one of A4]-D4] above, wherein component b has a viscosity, at 25° C., ≤500 cSt, or ≤400 cSt, or ≤300 cSt, or ≤200 cSt, or ≤100 cSt, or ≤50 cSt, or ≤40 cSt.

F4] The composition of any one of A4]-E4] above, wherein component b has a viscosity, at 25° C., ≥0.5 cSt, or ≥1.0 cSt, or ≥1.5 cSt, or ≥2.0 cSt, or ≥2.5 cSt, or ≥3.0 cSt, or ≥3.5 cSt, or ≥4.0 cSt, or ≥4.5 cSt, or ≥5.0 cSt, or ≥6.0 cSt, or ≥8.0 cSt, or ≥10 cSt, or ≥12 cSt, or ≥14 cSt, or ≥16 cSt, or ≥18 cSt, or ≥20 cSt.

G4] The composition of any one of A4]-F4] above, wherein the silica portion of the siloxy-modified silica (component b) is derived from a silica Q resin.

H4] The composition of any one of A4]-G4] above, wherein the siloxy-modified silica comprises the following structure: $Q_nM^H_m$, as described above, and n≥2, or n≥3, or n≥4, or n≥6, or n≥8, or n≥10, or n≥15, or n≥20, and m≥3, or m≥4, or m≥6, or m≥8, or m≥10, or m≥15, or m≥20.

I4] The composition of H4] above, wherein n≤1,000, or n≤500, or n≤200, or n≤100, and m≤1,000, or m≤500, or m≤200, or m≤100.

J4] The composition of any one of A4]-I4] above, wherein the siloxy-modified silica comprises the structure selected from S6, as described above, and where the Q-resin of structure S6 is selected from S7, as described above, and for Structure S7, n≥2, or n≥4, or n≥6, or n≥8, or n≥10, or n≥15, or n≥20, and for Structure S6, m≥3, or m≥4, or m≥6, or m≥8, or m ≥10, or m≥20.

K4] The composition of J4] above, wherein n≤1,000, or n≤500, or n≤200, or n≤100, and m≤1,000, or m≤500, or m≤200, or m≤100.

L4] The composition of any one of A4]-K4] above, wherein the siloxy-modified silica comprises the structure selected from the following S1, S2, S3, S4, S5, or any combination thereof, and where each of S1, S2, S3, S4 and S5 is described above.

M4] The composition of any one of A4]-L4] above, wherein the hydrosilylation catalyst comprises Pt, Pd, Rh, Re, Ir, Ru, or a mixture thereof, and further Pt.

N4] The composition of any one of A4]-M4] above, wherein the elastomer (component a) is an ethylene/alpha-olefin/non-conjugated polyene interpolymer, further an ethylene/alpha-olefin/nonconjugated diene interpolymer, and further an ethylene/alpha-olefin/non-conjugated diene terpolymer.

O4] The composition of any one of A4]-N4] above, wherein the composition comprises ≥5.0 wt %, or ≥8.0 wt %, or ≥10.0 wt %, or ≥12.0 wt %, or ≥14.0 wt %, or ≥16.0 wt %, or ≥18.0 wt %, or ≥20.0 wt %, or ≥22.0 wt %, or ≥24.0 wt %, or ≥26.0 wt % of component a based on the weight of the composition.

P4] The composition of any one of A4]-O4] above, wherein the composition comprises ≤100.0 wt %, or ≤90.0 wt %, or ≤80.0 wt %, or ≤70.0 wt %, or 60.0 wt %, ≤50.0 wt %, or ≤40.0 wt %, or ≤35.0 wt %, or 30.0 wt % of component a based on the weight of the composition.

Q4] The composition of any one of A4]-P4] above, wherein the weight ratio of component a to component b is ≥5.0, or ≥5.5, or ≥6.0, or ≥6.5, or ≥7.0, or ≥7.5, or ≥8.0.

R4] The composition of any one of A4]-Q4] above, wherein the weight ratio of component a to component b is ≤80, or ≤70, or ≤60, or ≤50, or ≤40, or ≤35, or ≤30, or ≤25, or ≤20.

S4] The composition of any one of A4]-R4] above, wherein the weight ratio of component a to component c is ≥15, or ≥20, or ≥25, or ≥30, or ≥35, or ≥40.

T4] The composition of any one of A4]-S4] above, wherein the weight ratio of component a to component c is ≤50,000, or ≤10,000, or ≤5,000, or ≤1,000, or ≤800, or ≤600, or ≤400, or ≤200, or ≤150, or ≤100, or ≤90, or ≤80, or ≤60, or ≤55, or ≤50, or ≤45.

U4] The composition of any one of A4]-T4] above, wherein the weight ratio of component b to component c is ≥0.10, or ≥0.50, or ≥1.0, or ≥1.5, or ≥2.0, or ≥2.2, or ≥2.4, or ≥2.6.

V4] The composition of any one of A4]-U4] above, wherein the weight ratio of component b to component c is ≤3000, or ≤2000, or ≤1500, or ≤1000, or ≤500, or ≤40, or ≤30, or ≤20, or ≤10, or ≤9.0, or ≤8.0, or ≤7.0, or ≤6.0, or ≤5.5, or ≤5.0, or ≤4.5.

W4] The composition of any one of A4]-V4] above, wherein the composition comprises ≥0.20 wt %, or ≥0.30 wt %, or ≥0.40 wt %, or ≥0.60 wt %, or ≥0.80 wt %, or ≥1.0 wt %, or ≥1.1 wt %, or ≥1.2 wt %, or ≥1.4 wt %, or ≥1.6 wt % of component b based on the weight of the composition.

X4] The composition of any one of A4]-W4] above, wherein the composition comprises ≤8.0 wt %, or ≤6.0 wt %, or ≤5.0 wt %, ≤4.5 wt %, or ≤4.0 wt %, or ≤3.8 wt %, or 3.6 wt %, or ≤3.4 wt %, or ≤3.2 wt %, or ≤3.0 wt %, or ≤2.8 wt %, or ≤2.6 wt % of component b based on the weight of the composition.

Y4] The composition of any one of A4]-X4] above, wherein the composition comprises ≥0.10 wt %, or ≥0.15 wt %, or ≥0.20 wt %, or ≥0.22 wt %, or ≥0.24 wt %, or ≥0.26 wt %, or ≥0.28 wt %, or ≥0.30 wt %, or ≥0.35 wt %, or ≥0.40 wt %, or ≥0.45 wt % to ≤1.00 wt %, or ≤0.90 wt %, or ≤0.80 wt %, or ≤0.70 wt %, or ≤0.65 wt %, ≤0.60 wt %, or ≤0.58 wt %, or ≤0.56 wt % of component c based on the weight of the composition.

Z4] The composition of any one of A4]-Y4] above, wherein the composition comprises ≥0.0005 wt %, or ≥0.0006 wt %, or ≥0.0008 wt %, or ≥0.0010 wt %, to ≤0.0100 wt %, or ≤0.0090 wt %, or ≤0.0080 wt %, or ≤0.0070 wt %, or ≤0.0060 wt %, ≤0.0050 wt % of a metal component of component c, based on the weight of the composition. In a further embodiment, the metal component is selected from Pt, Pd, Rh, Re, Ir, Ru, or a mixture thereof, and further Pt.

A5] The composition of any one of A4]-Z4] above, wherein the composition further comprises at least one filler, further at least two fillers.

B5] The composition of any one of A4]-A5] above, wherein the composition further comprises a first filler and a second filler.

C5] The composition of B5] above, wherein the weight ratio of the first filler to the second filler is ≥1.0, or ≥1.5, or ≥1.8, or ≥2.0.

D5] The composition of B5] or C5] above, wherein the weight ratio of the first filler to the second filler is ≤5.0, or ≤4.5, or ≤4.0, or ≤3.5, or ≤3.0.

E5] The composition of any one of B5]-D5] above, wherein the first filler is carbon black.

F5] The composition of any one of B5]-E5] above, wherein the second filler is an oxide, a carbonate, or a combination thereof, and further a metal carbonate.

G5] The composition of any one of A5]-F5] above, wherein the weight ratio of the sum of the filler(s) to component a is ≥1.0, or ≥1.2, or ≥1.4, or ≥1.6, or ≥1.8, or ≥2.0, or ≥2.2.

H5] The composition of any one of A5]-G5] above, wherein the weight ratio of the sum of the filler(s) to component a is ≤4.0, or ≤3.5, or ≤3.0, or ≤2.8, or ≤2.6, or ≤2.4.

I5] The composition of any one of A4]-H5] above, wherein the composition further comprises a polybutadiene, and further a liquid (at 25° C., ambient atmosphere) polybutadiene. This polybutadiene is different (for example, lower Mn) from a polybutadiene elastomer of component a.

J5] The composition of I5] above, wherein the composition comprises ≥0.20 wt %, or ≥0.25 wt %, or ≥0.30 wt %, or ≥0.35 wt %, or ≥0.40 wt %, or ≥0.42 wt %, or ≥0.45 wt % of the polybutadiene based on the weight of the composition.

K5] The composition of I5] or J5] above, wherein the composition comprises ≤5.0 wt %, ≤4.5 wt %, or ≤4.0 wt %, or ≤3.5 wt %, or 3.0 wt %, ≤2.5 wt %, or ≤2.0 wt %, of the polybutadiene based on the weight of the composition.

L5] The composition of any one of I5]-K5] above, wherein the polybutadiene comprises ≥5.0 mol %, or ≥10 mol %, or ≥15 mol %, or ≥20 mol %, or ≥22 mol %, or ≥24 mol %, or ≥26 mol % of 1,2-vinyl content, based on the total moles of carbon-carbon double bond groups in the polybutadiene.

M5] The composition of any one of I5]-L5] above, wherein the polybutadiene comprises ≤50 mol %, or ≤45 mol %, or ≤40 mol %, or ≤38 mol %, or ≤36 mol %, or ≤34 mol %, or ≤32 mol %, or ≤30 mol % of 1,2-vinyl content, based on the total moles of carbon-carbon double bond groups in the polybutadiene.

N5] The composition of any one of I5]-M5] above, wherein the polybutadiene has a number average molecular weight (Mn) ≥500 g/mol, or ≥600 g/mol, or ≥700 g/mol, or ≥800 g/mol, or ≥900 g/mol, or ≥1,000 g/mol, or ≥1,200 g/mol, or ≥1,400 g/mol, or ≥1,600 g/mol, or ≥1,800 g/mol, or ≥2,000 g/mol.

O5] The composition of any one of I5]-N5] above, wherein the polybutadiene has a number average molecular weight (Mn) ≤10,000 g/mol, or ≤8,000 g/mol, or ≤6,000 g/mol, or ≤4,000 g/mol, or ≤3,000 g/mol.

P5] The composition of any one of A4]-O5] above, wherein component a is an EPDM.

Q5] The composition of any one of N4]-P5] above, wherein the nonconjugated polyene of the interpolymer (component a) is ENB.

R5] The composition of any one of N4]-Q5] above, wherein the interpolymer (component a) comprises, in polymerized form, ≥0.5 wt %, or ≥0.7 wt %, or ≥1.0 wt %, or ≥1.5 wt %, or ≥2.0 wt %, or ≥2.5 wt %, or ≥3.0 wt %, or ≥3.5 wt %, or ≥4.0 wt %, or ≥4.5 wt % of ENB, based on the weight of the interpolymer.

S5] The composition of any one of N4]-R5] above, wherein the interpolymer (component a) comprises, in polymerized form, ≤7.0 wt %, or ≤6.8 wt %, or ≤6.5 wt %, or ≤6.2 wt %, or ≤6.0 wt %, or ≤5.8 wt %, or ≤5.6 wt % of ENB, based on the weight of the interpolymer.

T5] The composition of any one of N4]-S5] above, wherein the interpolymer (component a) comprises, in polymerized form, ≥50.0 wt %, or ≥52.0 wt %, or ≥55.0 wt %, or ≥58.0 wt %, or ≥60.0 wt %, or ≥62.0 wt % of C2 (ethylene), based on the weight of the interpolymer.

U5] The composition of any one of N4]-T5] above, wherein the interpolymer (component a) comprises, in polymerized form, ≤84.0 wt %, or ≤82.0 wt %, or ≤80.0 wt %, or ≤78.0 wt %, or ≤76.0 wt %, or ≤74.0 wt % of C2 (ethylene), based on the weight of the interpolymer.

V5] The composition of any one of N4]-U5] above, wherein the interpolymer (component a) comprises, in polymerized form, ≥10 wt %, or ≥12 wt %, or ≥15 wt %, or ≥18 wt %, or ≥20 wt %, or ≥22 wt %, or ≥24 wt % of the alpha-olefin, based on the weight of the interpolymer.

W5] The composition of any one of N4]-V5] above, wherein the interpolymer (component a) comprises, in polymerized form, ≤40 wt %, or ≤38 wt %, or ≤35 wt %, or ≤32 wt %, or ≤30 wt % of the alpha-olefin, based on the weight of the interpolymer.

X5] The composition of any one of N4]-W5] above, wherein the alpha-olefin of the interpolymer (component a) is a C3-C20 alpha-olefin, and further a C3-C10 alpha-olefin, and further propylene, 1-butene, 1-hexene or 1-octene, and further propylene, 1-butene, or 1-octene, and further propylene or 1-octene, further propylene.

Y5] The composition of any one of A4]-X5] above, wherein the composition comprises ≤1.0 wt, or ≤0.5 wt %, or ≤0.05 wt %, or ≤0.01 wt % of a solvent, based on the weight of the composition.

Z5] The composition of any one of A4]-Y5] above, wherein the composition does not comprise a solvent.

A6] The composition of any one of A4]-Z5] above, wherein component a has a Mooney Viscosity (ML1+4 at 125° C.) ≥15, or ≥20, or ≥25, or ≥30, or ≥35, or ≥40, or ≥45, or ≥50, or ≥55.

B6] The composition of any one of A4]-A6] above, wherein component a has a Mooney Viscosity (ML1+4 at 125° C.) ≤90, or ≤85, or ≤80, or ≤78, or ≤75, or ≤72.

C6] The composition of any one of A4]-B6] above, wherein component a has a molecular weight distribution (MWD) ≥1.0, or ≥1.2, or ≥1.4, or ≥1.6, or ≥1.8, or ≥2.0, or ≥2.2, or ≥2.4, or ≥2.6, or ≥2.8.

D6] The composition of any one of A4]-C6] above, wherein component a has a molecular weight distribution (MWD) ≤50, or ≤40, or ≤30, or ≤20, or ≤10, or ≤8.0, or ≤6.0, or ≤4.0, or ≤3.8, or ≤3.6, or ≤3.4, or ≤3.2, or ≤3.0.

E6] The composition of any one of A4]-D6] above, wherein component a has a % crystallinity ≥0%, or ≥0.5%, or ≥1.0%, or 2.0%, or ≥4.0%, or ≥6.0%, or ≥8.0%.

F6] The composition of any one of A4]-E6] above, wherein component a has a % crystallinity ≤50%, ≤45%, or ≤40%, ≤35%, or ≤30%, ≤28%, or ≤25%, ≤22%, or ≤20%, or ≤18%, ≤16%, or ≤14%, or ≤13%, or ≤12%.

G6] The composition of any one of A4]-F6] above, wherein component a has a density ≥0.860, or ≥0.865, or ≥0.870, or ≥0.872, or ≥0.874, or ≥0.876, or ≥0.878, or ≥0.880 g/cc.

H6] The composition of any one of A4]-G6] above, wherein component a has a density ≤10 ≤0.950, or ≤0.940, or ≤0.930, or ≤0.920, or ≤0.910, or ≤0.905, or ≤0.900, or ≤0.890 g/cc.

I6] The composition of any one of A4]-H6] above, wherein component a has a melt index (I2) ≥0.5 dg/min, or ≥1.0 dg/min, or ≥2.0 dg/min, or ≥5.0 dg/min, or ≥10 dg/min.

J6] The composition of any one of A4]-I6] above, wherein component a has a melt index (I2) ≤1,000 dg/min, or ≤500 dg/min, or ≤250 dg/min, or ≤100 dg/min, or ≤50 dg/min, or ≤20 dg/min.

K6] The composition of any one of A4]-J6] above, wherein the composition further comprises an oil.

L6] The composition of any one of A4]-K6] above, wherein the composition comprises ≥10.0 wt %, or ≥12.0 wt %, or ≥14.0 wt %, or ≥16.0 wt %, or ≥18.0 wt %, or ≥20.0 wt % of the sum of components a, b and c, based on the weight of the composition.

M6] The composition of any one of A4]-L6] above, wherein the composition comprises ≤100.0 wt %, or ≤90.0 wt %, or ≤80.0 wt %, or ≤70.0 wt %, or ≤60.0 wt %, or ≤50.0 wt %, or ≤40.0 wt %, or ≤38.0 wt %, or ≤36.0 wt %, or ≤34.0 wt %, or ≤32.0 wt %, or ≤30.0 wt %, or ≤28.0 wt %, or ≤26.0 wt %, or ≤24.0 wt % of the sum of components a, b and c, based on the weight of the composition.

N6] The composition of any one of A4]-M6] above, wherein the composition further comprises a thermoplastic polymer, different from the elastomer of component a in one or more features, such as monomer(s) types and/or amounts, density, Mooney Viscosity (ML 1+4, 125° C.), percent crystallinity, or any combination thereof.

O6] The composition of any one of A4]-N6] above, wherein the composition, after thermal treatment at a temperature of 185° C., for 20 minutes, has a "MH-ML" value ≥0.80, or ≥0.90, or ≥1.00, or ≥1.50, or ≥2.00, or ≥2.50, or ≥3.00, or ≥4.00, or ≥4.50, or ≥5.00, or ≥5.50, or ≥6.00, or ≥6.50, or ≥7.00, or ≥8.00, or ≥9.00, or ≥10.00. The MH value and the ML value are determined by MDR as described herein. Units=dN*m.

P6] The composition of any one of A4]-O6] above, wherein the composition, after thermal treatment at a temperature of 185° C., for 20 minutes, has a "MH-ML" value ≤50.0, or ≤45.0, or ≤40.0, or ≤35.0, or ≤30.0, or ≤28.0, or ≤26.0. Units=dN*m.

Q6] The composition of any one of A4]-P6] above, wherein the composition, after thermal treatment at a temperature of 185° C., for 20 minutes, has a [(MH-ML)/T90%] value ≥0.20, or ≥0.25, or ≥0.30, or ≥0.35, or ≥0.40, or ≥0.50, or ≥0.80, or ≥1.00, or ≥1.50, or ≥2.00, or ≥4.00, or ≥6.00, or ≥7.00, or ≥8.00, or ≥10.00. The MH, ML and the T90% values are determined by MDR as described herein. Units=dN*m/min.

R6] The composition of any one of A4]-Q6] above, wherein the composition, after thermal treatment at a temperature of 185° C., for 20 minutes, has a [(MH-ML)/T90%] value ≤50, or ≤40, or ≤30, or ≤28. Units=dN*m/min.

S6] The composition of any one of A4]-R6] above, wherein the composition has a Compression Set (24 hours/70° C.) ≤20, or ≤18, or ≤16, or ≤14.

T6] The composition of any one of A4]-S6] above, wherein the composition has an odor intensity rating ≤4.00, or ≤3.80, or ≤3.60.

U6] The composition of any one of A4]-T6] above, wherein the composition has an odor hedonic rating ≥2.20, or ≥2.40, or ≥2.60, or ≥2.80.

V6] A crosslinked composition formed from the composition of any one of A4]-U6] above.

W6] An article comprising at least one component formed from the composition of any one of A4]-V6] above.

X6] The article of W6] above, wherein the article is an extruded article (for example, an extruded profile), an injected molded article, or a thermoformed article.

Y6] The article of W6] or X6] above, wherein the article is selected from an automotive part, a building material, a roofing membrane, a wire or cable jacket, a flooring material, a computer part, a gasket, or a tire.

Test Methods

Gel Permeation Chromatography

The chromatographic system consists of a PolymerChar GPC-IR (Valencia, Spain) high temperature GPC chromatograph, equipped with an internal IR5 infra-red detector (IR5). The autosampler oven compartment is set at 160° Celsius, and the column compartment is set at 150° Celsius. The columns are four AGILENT "Mixed A" 30 cm, 20-micron linear mixed-bed columns. The chromatographic solvent is 1,2,4-trichloro-benzene, which contains 200 ppm of butylated hydroxytoluene (BHT). The solvent source is nitrogen sparged. The injection volume is 200 microliters, and the flow rate is 1.0 milliliters/minute.

Calibration of the GPC column set is performed with 21 narrow molecular weight distribution polystyrene standards, with molecular weights ranging from 580 to 8,400,000, and which are arranged in six "cocktail" mixtures, with at least a decade of separation between individual molecular weights. The standards are purchased from Agilent Technologies. The polystyrene standards are prepared at "0.025 grams in 50 milliliters" of solvent, for molecular weights equal to, or greater than, 1,000,000, and at "0.05 grams in 50 milliliters" of solvent, for molecular weights less than 1,000,000. The polystyrene standards are dissolved at 80 degrees Celsius, with gentle agitation, for 30 minutes. The polystyrene standard peak molecular weights are converted to polyethylene molecular weights using Equation 1 (as described in Williams and Ward, J. Polym. Sci., Polym. Let., 6, 621 (1968)):

$$M_{polyethylene}=A\times(M_{polystyrene})^{B} \qquad \text{(EQ1)},$$

where M is the molecular weight, A has a value of 0.4315 and B is equal to 1.0.

A fifth order polynomial is used to fit the respective polyethylene-equivalent calibration points. A small adjustment to A (from approximately 0.375 to 0.445) is made to correct for column resolution and band-broadening effects, such that linear homopolymer polyethylene standard is obtained at 120,000 Mw.

The total plate count of the GPC column set is performed with decane (prepared at "0.04 g in 50 milliliters" of TCB, and dissolved for 20 minutes with gentle agitation.) The plate count (Equation 2) and symmetry (Equation 3) are measured on a 200 microliter injection according to the following equations:

$$\text{Plate Count} = 5.54 * \left( \frac{(RV_{Peak\,Max}}{\text{Peak Width at } \frac{1}{2} \text{ height}} \right)^2, \quad \text{(EQ2)}$$

where RV is the retention volume in milliliters, the peak width is in milliliters, the peak max is the maximum height of the peak, and ½ height is ½ height of the peak maximum; and $$\text{Symmetry} = \frac{(\text{Rear Peak } RV_{one\,tenth\,height} - RV_{Peak\,max})}{(RV_{Peak\,max} - \text{Front Peak } RV_{one\,tenth\,height})}, \quad \text{(EQ3)}$$

where RV is the retention volume in milliliters, and the peak width is in milliliters, Peak max is the maximum position of the peak, one tenth height is 1/10 height of the peak maximum, and where rear peak refers to the peak tail at later retention volumes than the peak max, and where front peak refers to the peak front at earlier retention volumes than the peak max. The plate count for the chromatographic system should be greater than 18,000, and symmetry should be between 0.98 and 1.22.

Samples are prepared in a semi-automatic manner with the PolymerChar "Instrument Control" Software, wherein the samples are weight-targeted at 2 mg/ml, and the solvent (contained 200 ppm BHT) is added to a pre nitrogen-sparged, septa-capped vial, via the PolymerChar high temperature autosampler. The samples are dissolved for two hours at 160° Celsius under "low speed" shaking.

The calculations of $Mn_{(GPC)}$, $Mw_{(GPC)}$, and $MZ_{(GPC)}$ are based on GPC results using the internal IR5 detector (measurement channel) of the PolymerChar GPC-IR chromatograph according to Equations 4-6, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 1. Equations 4-6 are as follows:

$$Mn_{(GPC)} = \frac{\sum^{i} IR_i}{\sum^{i} \left( IR_i / M_{polyethylene_i} \right)}, \quad \text{(EQ4)}$$

$$Mw_{(GPC)} = \frac{\sum^{i} \left( IR_i * M_{polyethylene_i} \right)}{\sum^{i} IR_i}, \text{ and} \quad \text{(EQ5)}$$

$$Mz_{(GPC)} = \frac{\sum^{i} \left( IR_i * M^2_{polyethylene_i} \right)}{\sum^{i} \left( IR_i * M_{polyethylene_i} \right)}. \quad \text{(EQ6)}$$

In order to monitor the deviations over time, a flowrate marker (decane) is introduced into each sample, via a micropump controlled with the PolymerChar GPC-IR system. This flowrate marker (FM) is used to linearly correct the pump flowrate (Flowrate(nominal)) for each sample, by RV alignment of the respective decane peak within the sample (RV(FM Sample)), to that of the decane peak within the narrow standards calibration (RV(FM Calibrated)). Any changes in the time of the decane marker peak are then assumed to be related to a linear-shift in flowrate (Flowrate (effective)) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system, based on a flow marker peak, the effective flowrate (with respect to the narrow standards calibration) is calculated as Equation 7:

Flowrate(effective)=Flowrate(nominal)*(RV(FM Calibrated)/RV(FM Sample)) (EQ7).

Processing of the flow marker peak is done via the PolymerChar GPCOne™ Software. Acceptable flowrate correction is such that the effective flowrate is within +/−0.7% of the nominal flowrate.

Melt Index

The melt index (I2) of an ethylene-based polymer is measured in accordance with ASTM D-1238, condition 190° C./2.16 kg. The melt flow rate (MFR) of a propylene-based polymer is measured in accordance with ASTM D-1238, condition 230° C./2.16 kg.

Polymer Density

Polymer density is measured in accordance with ASTM D-297.

Mooney Viscosity of Polymer (No oil, no filler)

Mooney Viscosity (ML1+4 at 125° C.) was measured in accordance with ASTM 1646, with a one minute preheat time and a "four minute" rotor operation time. The instrument was an Alpha Technologies Mooney Viscometer 2000. Sample size around 25 grams.

Mooney Viscosity of Composition

Mooney Viscosity (ML1+4) and stress relaxation (ML1+4+2 min) of each composition was recorded with an Alpha Technologies MV2000E Viscometer, according to ASTM D1646-19, at 100° C. (large rotor). The preheating time was one minute. The viscosity of each formulated composition was measured using an uncured sheet (see experimental section) of about 25 grams.

Cure Dynamics—MDR

Cure characteristics were measured using a Priscott Rheo-Line Moving Die Rheometer according to ASTM-D5289-15, at 185° C. or at 180° C., and with a 0.5 deg arc. The test period was 20 minutes at 185° C., or 15 minutes at 180° C. Each sample (4-5 grams) was cut from its respective uncured sheet (see experimental section). The following data were used from each MDR run: MH (dN*m), or the maximum torque exerted by the MDR during the testing interval (this usually corresponds to the torque exerted at the final time point of the test interval, or the maximal torque reached during MDR test); ML (dN*m), or the minimum torque exerted by the MDR during the testing interval (this usually corresponds to the lowest torque during the MDR test). Additional reported values were ts1 and ts2 (time to reach, respectively, a "1 unit" and a "2 unit" increase in the torque from ML), T10% (or tc10), T20%, T50% (or tc50) and T90% (or tc90) (time to reach, respectively, a 10%, 20%, 50% and 90% of the maximum cure or MH value). It is noted that the composition readily equilibrates (less than 30 seconds) to the set temperature of the MDR device.

Tensile Strength

Tensile properties were measured according to ASTM D412, using a Zwick Roell Z010 device. Each dumbbell sample (type 5A) was die cut from a compression molded (cured) plaque (T90%+5 minutes, 185° C., 10 MPa, 2 mm thick plaque)—see experimental section. Here "T90%" is the time for the sample to reach 90% of its maximum cure value (MH value), as determined by MDR. Tensile properties (Tensile Strength, Elongation at Break (or Tensile Elongation), Modulus) were measured at room temperature, following the method ASTM D-412, in the machine direction, with a traverse speed of 500 mm/min.

FTIR Method for EPDM Composition Analysis

The EPDM terpolymers containing ethylene, propylene, and 5-ethylidene-2-norbornene were analyzed, using ASTM D3900 for ethylene content, and ASTM D6047 for ethylidene-norbornene content. Similar analyses can be used to measure the monomer content (for example, C2, alpha-olefin or diene) of other interpolymers and terpolymers.

Compression Set

Compression Set was measured according to ASTM D395 for 24 hours at 70° C. Disks of "29 mm" in diameter and "12 mm" in thickness, were die cut from compression molded plaques (185° C., 10 MPa, T90%+10 minutes, 12 mm thickness). See experimental section. Each sample disk was inspected for notches, uneven thickness and inhomogeneity, and selected disks(without those defects) were tested. Compression Set was performed on two specimens for each composition, and the average result reported. The disk was placed in the compression device, having two metal plates that could be pressed together and locked into place at 25% of the original height of the button sample. The compression device, with the compressed disk, was then placed in an oven, and equilibrated at the appropriate temperature for a specified time (24 hours at 70° C., or 168 hours at 70° C.). In this test, the stress was released at the test temperature, and the thickness of the sample disk was measured after a "30 minute" equilibration period at room temperature. Compression Set is a measured of the degree of recovery of a sample following compression, and is calculated according to the equation CS=(H0−H2)/(H0−H1); where H0 is the original thickness of the disk, H1 is the thickness of the spacer bar used, and H2 is the final thickness of the disk after removal of the compressive force.

Shore A Hardness

Shore A Hardness was measured according to ASTM D2240, using three layers of tensile strength samples (T90%+10 minutes, 185° C., 100 MPa) for 6 mm total thickness for three layers). Shore A hardness was measured on a Shore A Durometer Model 2000, made by INSTRON, with a Durometer Stand Model 902. This method permits hardness measurements, based on either initial indentation, or indentation after a specific time, or both. Here, the indentation was measured after at a specified time of three seconds.

Odor Test

Sample Preparation—A "3.8 cm×3.8 cm×2 mm" square piece of a compression molded plaque (see experimental section) was placed into a 100 mL glass vial for testing. The vial was secured with lid. The sample vial was labelled with a random number. The sequence of the samples presented to the panelists is also random. The sealed glass vials were heated in oven at 80° C. for two hours, and then cool to 60° C. The trained human panel was comprised of in-house employees who have been certified by SGS. Co. Ltd., on odor intensity and hedonic training. In total, 15 panelists participated in this sensory test.

Paired Comparison Method—Two sets of samples (sealed glass vials) were prepared for each panelist, and each set was put on one sample tray for the panelist to evaluate in the same test. Each panelist evaluated each sample for odor intensity and hedonic (pleasant or unpleasant) odor. After evaluation of the first sample set, the panelist rated each sample in regard to odor properties. Then each panelist evaluated the second sample set only for the intensity of odor. The Paired Comparison Method is traditionally regarded as the most straight forward difference test. Panelists were asked to select which of the two samples had the least intense (better) odor. This method determined if there was a difference between two samples, and if so, which one was better. Two sets of samples were evaluated to provide a measure of the test's reproducibility.

Die-T Tear Strength

Tear Strength was measured according to ASTM D624 type-T (Trouser Tear sample) on a Zwick Roell Z010 device, with a traverse speed of 100 mm/min. Test samples were cut from compression molded (cured) plaques (T90%+5 minutes, 185° C., 10 MPa, 2 mm thick).

Kinematic Viscosity

The kinematic viscosity (cSt) is determined in accordance with ASTM D-445, at a constant bath (for example, water) temperature of 25° C.+/−0.2° C., using, for example, a Cannon-Fenske (No. 150) viscometer.

EXPERIMENTAL

Commercial Polymers and Additives

NORDEL 4760P, EPDM, MV=60 (ML 1+4, 125° C.), density=0.88 g/cc, % cryst.=10%, 4.9 wt % ENB, 67 wt % ethylene, available from the Dow Chemical Company. NORDEL 4770P, EPDM, MV=70 (ML 1+4, 125° C.), density=0.88 g/cc, % cryst.=13%, 4.9 wt % ENB, 70 wt % ethylene, available from the Dow Chemical Company. VISTALON 1705, EPDM, MV=35-51 (ML 1+4, 125° C.), 0.70-0.90 wt % VNB, 62-77 wt % ethylene, available from Exxon Mobil.

Natural Rubber SVR3L, density=0.92 g/cc, available from Vietnam. Polybutadiene Rubber BR9000 available from Zhejiang Transfar Chemicals. Styrene Butadiene Rubber SBR1502, specific gravity=0.94 g/cc (based on water), available from Sinopec Yangzi Petrochemical Company LTD. Nitrile Rubber NBR3370c available from Lanxess.

Hydrosilylation catalyst: Platinum, 1,3-diethenyl-1,1,3,3-tetramethyldisiloxane complexes (CAS: 68478-92-2) in a vinyl terminated polydimethylsiloxane solution (about 5200 ppm Pt). Such catalyst complexes are available from the Dow Chemical Company.

Carbon Black N-550 available from by Cabot. Calcium carbonate ($CaCO_3$) filler available from Omya. Silicate—VN-3 (SiO2) available from Evonik.

2,4,6,8-Tetramethyltetravinylcyclotetrasiloxane (vi-d4) (CAS: 2554-06-5) available from the Dow Chemical Company. Multi-vinyl siloxane: Dimethy cyclics with tetrakis (vinyldimethylsiloxy)silane (CAS: 316374-82-0). Such a mixture is available from the Dow Chemical Company.

RICON 130 (CAS: 9003-17-2), polybutadiene with 28 mol % of 1,2-vinyl content, and Mn=2500 g/mol, available from Total Cray Valley. NISSO PB B-1000 (CAS: 9003-17-2), polybutadiene with 85 mol % of 1, 2-vinyl content, and Mn=1200 g/mol, available from Nippon Soda Co., Ltd.

TAIC (triallyl isocyanurate) available from Sinopharm Chemical Reagent Co., Ltd. TRIM (trimethylolpropane trimethacrylate) available from Sinopharm Chemical Reagent Co., Ltd. SUNPAR 2280—Plasticizer/paraffinic oil, available from R.E. Carroll, Inc. RHENOGRAN ZnO-80—Cure Activator, available from Rhein Chemie. Stearic acid—Cure Activator and process aid, available from Loxiol. RHENOGRAN CaO-80—Desiccant, available from Rhein Chemie. PEG 4000—Process aid (Polyethylene Glycol), available from Sinoreagent in China.

RHENOGRAN MBTS-75—Cure Accelerator, available from Rhein Chemie. RHENOGRAN MBTS-80—Cure Accelerator, available from Rhein Chemie. RHENOGRAN ZDEC-80—Cure Accelerator, available from Rhein Chemie. RHENOGRAN CBS-80—Delayed Action Accelerator, available from Rhein Chemie. RHENOGRAN S-80—Curative, available from Rhein Chemie. DTDM-80—Cure Accelerator, available from Rhein Chemie. TETD-75—Cure Accelerator, available from Rhein Chemie. TETD-80—Cure Accelerator, available from Rhein Chemie. ZDBC-80—Cure Accelerator, available from Rhein Chemie. ZDEC-80—Cure Accelerator, available from Rhein Chemie.

Si—H-1: Dimethylhydrogensiloxy modified silica (CAS: 102262-28-2), viscosity=25 cSt (25° C.), available from the Dow Chemical Company.

Si—H-2: DOWSIL 6-3570 Polymer (linear siloxane) (CAS: 68037-59-2), fluid, viscosity=5 cSt (25° C.), available from the Dow Chemical Company. Not a siloxy modified silica.

Si—H-3: HQM-105 (CAS: 68988-57-8), hydride modified silica Q resin (a siloxy-modified silica), viscosity=3-5 cSt (25° C.), available from Gelest.

Si—H-4: Tris(dimethylsilyloxy)phenylsilane (CAS: 18027-45-7) available from TCI Shanghai.

Si—H-5: Methyltris(dimethylsiloxy)silane (CAS: 17082-46-1) available from TCI Shanghai.

Si—H-6: 1,3,5,7-Tetramethylcyclotetrasiloxane (CAS: 2370-88-9) available from TCI Shanghai.

Si—H-7: Tetrakis(dimethylsiloxy)silane (CAS: 17082-47-2) available from Shanghai Aladdin Biochemical Technology Co., Ltd.

Si—H-8: 1,1,3,3,5,5-Hexamethyltrisiloxane (CAS: 1189-93-1) available from Alfa Aesar.

Si—H-9: 1,1,3,3-Tetramethyldisiloxane (CAS: 3277-26-7) available from Alfa Aesar.

Si—H-10: Phenylsilsesquioxanes, hydrogen-terminated (CAS: 68952-30-7) available from the Dow Chemical Company.

Compounding Process—Studies 1-3 and 5

The fillers ($CaCO_3$, Carbon Black N550) oil (SUNPAR 2280), and liquid additives (silicone hydride ("Si—H-_" compound), hydrosilylation catalyst) and remaining additives were weighted into a container, and mixed by hand, until the mixture turned into black solid particles. The solid particles were then dumped into an internal mixer (HAAKE Polylab OS), and mixed at 40° C. and 45 RPM. After one minute, the elastomer were added into the mixer, the mixer was then covered, and mixing continued for about one minute, until the torque of the mixed composition equilibrated (about 38-40 Nm). Next, the RPM of the HAAKE mixer was increased to 70 RPM, and the mixing was continued for six minutes. Then the mixing was stopped (mixed composition reached about 100° C.). The resulting composition was then removed from the mixer, and pressed into a plaque (about 5 mm thick), using a hydraulic press, at 2.5 MPa, and at room temperature. A small piece of the plaque with a square area (about 30 mm×30 mm, 6-8 grams) was cut for the MDR measurement. MDR was measured at 185° C. for 20 minutes by a Priscott Rheo-Line Moving Die Rheometer according to ASTM-D5289-15.

The compositions for the physical and mechanical properties and the odor test were prepared by the internal mixing method described above. Each resulting composition was compression molded at 185° C., 10 MPa, and with a time of "T90%+5 min." The mold was a "2 mm thick" and "15 cm×15 cm" area for a plaque. Each dumbbell (type 5A) test sample was die cut from a plaque. Plaques for Compression Set were prepared by compression molding at 185° C., 10 MPa, for T90%+10 min. Each test sample was a "12 mm thick×29 mm diameter" round disk, die cut from a compression molded plaque.

Study 1—Effects of Different "Si—H" Compounds on Hydrosilylation Cure

Table 1 lists the MDR cure properties for six inventive compositions (Inv.1-Inv.6) and eight comparative compositions (Comp. A-Comp. H). As seen from Table 1, the compositions containing the two siloxy-modified silica compounds (Si—H-1 and Si—H-3) had high levels of cure, as indicated by high "MH-ML" values. Optimum results were obtained for the compositions containing the "Si—H-1" compound (Inv. 1 and Inv. 3-Inv. 6). See "MH-ML" and "[(MH-ML)/T90%]" results.

Cure properties, mechanical properties and odor ratings for an inventive composition (Inv. 1) and a comparative industry composition (Comp. I) are shown in Table 2. The inventive composition had good cure properties and good mechanical properties, in terms of Tensile Strength, Elongation, Hardness and Tear. The inventive composition had superior Compression Set. Most importantly, the odor test showed that the odor properties of the "hydrosilylation-cured EPDM" of the inventive composition was significantly better than the odor properties of the "sulfur-cured EPDM" of the industry composition. Note, the aging of the samples was done in a hot air circulating (convection) oven.

Study 2—Filler, Oil and/or Curative Loading on the Mechanical Properties

The mechanical properties of different formulations containing the siloxy-modified silica compound (Si—H-1) are shown in Tables 3A and 3B. As seen in these tables, the elastomer loading varied from 21 to 30 wt %, and the weight ratio of filler to oil varied from about 2.0 to 2.5. The hydrosilylation catalyst loading varied from 0.8 to 2.5 phr. The Si—H-1 compound varied from 3.0 to 8.0 phr. The elastomer formulations all gave reasonable mechanical properties, such as Tensile Strength (TS), which varied from 5.6 to 8.8 MPa, and Tensile Elongation (TE), which varied from 126 to 488%. Inventive Examples 12 to 18, which contained from 28 to 30 wt % EPDM, had optimal properties for weather strip products.

Study 3—Hydrosilylation Cure of Different Elastomers

Table 4 demonstrates that the hydrosilylation crosslinking is not only feasible for EPDM (NORDEL 4760P), but also can be applied to other elastomers, such as, natural rubber (SVR3L), polybutadiene rubber (BR9000), styrene butadiene rubber (SBR1502), and nitrile rubber (NBR3370c).

TABLE 1

The Effect of Different Silicone Hydride Compounds on Curing Performance

| Composition | Inv. 1 | Inv. 2 | Comp. A | Comp. B | Comp. C | Comp. D | Comp. E | Comp. F | Comp. G | Comp. H | Inv. 3 | Inv. 4 | Inv. 5 | Inv. 6 |
|---|---|---|---|---|---|---|---|---|---|---|---|---|---|---|
| Whitening (CaCO3) | 60.00 | 60.00 | 60.00 | 60.00 | 60.00 | 60.00 | 60.00 | 60.00 | 60.00 | 60.00 | 60.00 | 60.00 | 60.00 | 60.00 |
| Carbon Black N550 | 180.00 | 180.00 | 180.00 | 180.00 | 180.00 | 180.00 | 180.00 | 180.00 | 180.00 | 180.00 | 180.00 | 180.00 | 180.00 | 180.00 |

TABLE 1-continued

The Effect of Different Silicone Hydride Compounds on Curing Performance

| Composition | Inv. 1 | Inv. 2 | Comp. A | Comp. B | Comp. C | Comp. D | Comp. E | Comp. F | Comp. G | Comp. H | Inv. 3 | Inv. 4 | Inv. 5 | Inv. 6 |
|---|---|---|---|---|---|---|---|---|---|---|---|---|---|---|
| Paraffinic oil, SUNPAR 2280 | 115.00 | 115.00 | 115.00 | 115.00 | 115.00 | 115.00 | 115.00 | 115.00 | 115.00 | 115.00 | 115.00 | 115.00 | 115.00 | 115.00 |
| PEG 4000 | 2.00 | 2.00 | 2.00 | 2.00 | 2.00 | 2.00 | 2.00 | 2.00 | 2.00 | 2.00 | 2.00 | 2.00 | 2.00 | 2.00 |
| CaO-80 | 6.00 | 6.00 | 6.00 | 6.00 | 6.00 | 6.00 | 6.00 | 6.00 | 6.00 | 6.00 | 6.00 | 6.00 | 6.00 | 6.00 |
| NORDEL 4760P | 100.00 | 100.00 | 100.00 | 100.00 | 100.00 | 100.00 | 100.00 | 100.00 | 100.00 | 100.00 | | | | |
| VISTALON 1705 | | | | | | | | | | | 100.00 | 100.00 | 100.00 | 100.00 |
| Si—H-1 | 8.00 | | | | | | | | | | 1.45 | 5.00 | 8.00 | 12.00 |
| Si—H-3 | | 8.00 | | | | | | | | | | | | |
| Si—H-10 | | | 8.00 | | | | | | | | | | | |
| Si—H-2 | | | | 8.00 | | | | | | | | | | |
| Si—H-4 | | | | | 8.00 | | | | | | | | | |
| Si—H-8 | | | | | | 8.00 | | | | | | | | |
| Si—H-6 | | | | | | | 8.00 | | | | | | | |
| Si—H-5 | | | | | | | | 8.00 | | | | | | |
| Si—H-7 | | | | | | | | | 8.00 | | | | | |
| Si—H-9 | | | | | | | | | | 8.00 | | | | |
| Hydrosilylation catalyst | 2.50 | 2.50 | 2.50 | 2.5 | 2.50 | 2.50 | 2.50 | 2.50 | 2.50 | 2.50 | 2.50 | 2.50 | 2.50 | 2.50 |
| Total (wt. parts) | 473.50 | 473.50 | 473.50 | 473.50 | 473.50 | 473.50 | 473.50 | 473.50 | 473.50 | 473.50 | 466.95 | 470.50 | 473.50 | 477.50 |
| ML (dN*m) | 2.19 | 1.99 | 2.73 | 1.87 | 2.57 | 2.55 | 1.85 | 2.55 | 2.16 | 2.79 | 1.30 | 1.57 | 1.61 | 1.45 |
| MH (dN*m) | 13.75 | 5.78 | 3.81 | 3.29 | 2.89 | 2.77 | 4.22 | 2.77 | 2.30 | 3.17 | 3.29 | 8.21 | 8.21 | 6.34 |
| MH-ML (dN*m) | 11.56 | 3.79 | 1.08 | 1.42 | 0.32 | 0.22 | 2.37 | 0.22 | 0.14 | 0.38 | 1.99 | 6.64 | 6.60 | 4.89 |
| [(MH-ML)/T90%] (dN*m/min) | 1.64 | 0.39 | 0.23 | 0.48 | 0.04 | 0.17 | 0.14 | 0.17 | 0.18 | 0.08 | 4.74 | 26.56 | 12.45 | 4.04 |
| TS1 (min) | 0.27 | 0.43 | 7.12 | 0.93 | na | na | 4.25 | na | na | na | 0.18 | 0.07 | 0.09 | 0.08 |
| TS2 (min) | 0.37 | 0.88 | na | Na | na | na | 15.23 | na | na | na | na | 0.10 | 0.12 | 0.12 |
| T10% (min) | 0.28 | 0.26 | 0.20 | 0.19 | 0.27 | 0.24 | 0.34 | 0.24 | 0.19 | 0.29 | 0.09 | 0.06 | 0.08 | 0.05 |
| T20% (min) | 0.40 | 0.36 | 0.26 | 0.25 | 0.33 | 0.30 | 0.76 | 0.30 | 0.24 | 0.36 | 0.11 | 0.08 | 0.10 | 0.08 |
| T50% (min) | 0.90 | 0.81 | 0.52 | 0.51 | 0.58 | 0.47 | 6.22 | 0.47 | 0.34 | 0.63 | 0.18 | 0.13 | 0.16 | 0.13 |
| T90% (min) | 7.05 | 9.83 | 4.60 | 2.94 | 8.90 | 1.27 | 16.84 | 1.27 | 0.78 | 4.64 | 0.42 | 0.25 | 0.53 | 1.21 |

MDR: 20 minutes at 185° C.

TABLE 2

Weather-Strip Formulation - Mechanical and Odor Properties

| Composition | S cured (Comp. I) | Si—H cured (Inv. 1) |
|---|---|---|
| NORDEL 4760P | 100.00 | 100 |
| ZnO-80 | 6.00 | |
| Stearic acid | 2.00 | |
| PEG 4000 | 2.00 | 2.00 |
| Carbon black N-550 | 180.00 | 180.00 |
| CaCO3 Whitening | 60.00 | 60.00 |
| Paraffinic oil, SUNPAR 2280 | 115.00 | 115.00 |
| CaO-80 | 6.00 | 6.00 |
| CBS-80 | 0.75 | |
| MBTS-75 | 1.50 | |
| ZDBC-80 | 0.80 | |
| ZDEC-80 | 0.50 | |
| TETD-75 | 0.80 | |
| DTDM-80 | 0.60 | |
| S-80 | 2.00 | |
| Si—H-1 | | 8.00 |
| Hydrosilylation catalyst | | 2.50 |
| Total (wt. parts) | 477.95 | 473.50 |
| Elastomer (wt %) | 20.92 | 21.04 |
| Filler (wt %) | 50.21 | 50.67 |
| Oil (wt %) | 24.06 | 24.36 |
| ML (at 185° C., 20 min) (dN*m) | 1.49 | 2.19 |
| MH (at 185° C., 20 min) (dN*m) | 11.95 | 13.75 |
| MH − ML (dN*m) | 10.46 | 11.56 |
| [(MH − ML)/T90%] (dN*m/min) | 7.69 | 1.64 |
| ts1 (at 185° C., 20 min) (min) | 0.35 | 0.27 |
| ts2 (at 185° C., 20 min) (min) | 0.43 | 0.37 |

TABLE 2-continued

Weather-Strip Formulation - Mechanical and Odor Properties

| Composition | S cured (Comp. I) | Si—H cured (Inv. 1) |
|---|---|---|
| T10% (at 185° C., 20 min) (min) | 0.36 | 0.28 |
| T20% (at 185° C., 20 min) (min) | 0.44 | 0.40 |
| T50% (at 185° C., 20 min) (min) | 0.62 | 0.90 |
| T90% (at 185° C., 20 min) (min) | 1.36 | 7.05 |
| Hardness (Sh, A) | 74 | 70 |
| Tear (N/mm) | 32 | 32 |
| Tensile Strength TS (MPa) | 8.6 | 6.3 |
| Elongation at Break EB (%) | 431 | 356 |
| Hot Air Aging 70° C./70 h | | |
| Hardness (Sh A) | 79 | 77 |
| Tensile Strength TS (MPa) | 8.8 | 6.0 |
| Elongation at Break EB (%) | 322 | 370 |
| Compression Set C.S. 70° C./24 h (%) | 35 | 13 |
| Odor Test* | | |
| Odor Intensity Rating[a] | 4.33 | 3.50 |
| Odor Hedonic Rating[b] | 2.13 | 2.93 |

*Note:

For the 15 panelists, if $\geq$12 panelists choose the same sample as the "least intense," this sample is considered statistically different from the other sample. A significant difference was observed between the two compositions (Inv. 7 and Comp. I) by the following rating evaluations.

[a]1 = not perceptible; 2 = perceptible, not disturbing; 3 = clearly perceptible, not disturbing; 4 = disturbing; 5 = strongly disturbing; 6 = not acceptable. The average of the numbers is reported in Table 2.

[b]1 = dislike extremely; 2 = dislike very; 3 = dislike moderately; 4 = dislike slightly; 5 = neither like nor dislike; 6 = like slightly; 7 = like moderately; 8 = like very; 9 = like extremely. The average of the numbers is reported in Table 2.

TABLE 3A

Changing the Filler/Oil/Curative Loading to Adjust Mechanical Performance

| Composition | Inv. 7 | Inv. 8 | Inv. 9 | Inv. 10 | Inv. 11 |
|---|---|---|---|---|---|
| Whitening (CaCO3) dried | 60.00 | 50.00 | 40.00 | 50.00 | 50.00 |
| Carbon Black N550 | 180.00 | 170.00 | 160.00 | 170.00 | 170.00 |
| SUNPAR 2280 | 115.00 | 105.00 | 90.00 | 105.00 | 105.00 |
| PEG 4000 | 2.00 | 2.00 | 2.00 | 2.00 | 2.00 |
| CaO-80 | 6.00 | 6.00 | 6.00 | 6.00 | 6.00 |
| NORDEL 4760P | 100.00 | 100.00 | 100.00 | 100.00 | 100.00 |
| Si—H-1 | 8.00 | 8.00 | 8.00 | 8.00 | 6.00 |
| Hydrosilylation catalyst | 2.50 | 2.50 | 2.50 | 2.00 | 2.50 |
| Total (wt. parts) | 473.50 | 443.50 | 408.50 | 443.00 | 441.50 |
| Elastomer wt % | 21.12 | 22.55 | 24.48 | 22.57 | 22.65 |
| filler wt % | 50.69 | 49.61 | 48.96 | 49.66 | 49.83 |
| oil wt % | 24.29 | 23.68 | 22.03 | 23.70 | 23.78 |
| ML (dN*m) | 2.02 | 2.96 | 4.14 | 1.99 | 2.56 |
| MH (dN*m) | 15.93 | 18.08 | 19.94 | 12.59 | 11.23 |
| MH-ML (dN*m) | 13.91 | 15.12 | 15.80 | 10.60 | 8.67 |
| [(MH-ML)/T90%] (dN*m/min) | 1.99 | 2.32 | 2.39 | 1.19 | 1.49 |
| ts1 (min) | 0.26 | 0.25 | 0.25 | 0.31 | 0.26 |
| ts2 (min) | 0.37 | 0.36 | 0.36 | 0.48 | 0.40 |
| T10% (min) | 0.30 | 0.31 | 0.31 | 0.32 | 0.25 |
| T20% (min) | 0.46 | 0.48 | 0.52 | 0.50 | 0.36 |
| T50% (min) | 1.18 | 1.25 | 1.42 | 1.48 | 0.94 |
| T90% (min) | 6.99 | 6.52 | 6.62 | 8.92 | 5.81 |
| Hardness (Sh A) | 73.00 | 74.00 | 78.00 | 75.00 | 74.00 |
| TS (MPa) / TE (%) | 5.6 / 210 | 6.3 / 196 | 6.4 / 126 | 6.0 / 236 | 5.8 / 224 |

TABLE 3B

Changing the Filler/Oil/Curative Loading to Adjust Mechanical Performance

| Composition | Inv. 12 | Inv. 13 | Inv. 14 | Inv. 15 | Inv. 16 | Inv. 17 | Inv. 18 |
|---|---|---|---|---|---|---|---|
| Whitening (CaCO3) | 55.00 | 55.00 | 55.00 | 55.00 | 55.00 | 55.00 | 55.00 |
| Carbon Black N550 | 110.00 | 110.00 | 110.00 | 110.00 | 110.00 | 110.00 | 110.00 |
| SUNPAR 2280 | 65.00 | 65.00 | 65.00 | 65.00 | 65.00 | 65.00 | 65.00 |
| PEG 4000 | 2.00 | 2.00 | 2.00 | 2.00 | 2.00 | 2.00 | 2.00 |
| CaO-80 | 6.00 | 6.00 | 6.00 | 6.00 | 6.00 | 6.00 | 6.00 |
| Si—H-1 | 3.00 | 3.50 | 4.00 | 6.00 | 6.00 | 6.00 | 8.00 |
| Hydrosilylation catalyst | 0.87 | 1.00 | 1.00 | 1.00 | 2.00 | 1.50 | 1.50 |
| NORDEL 4770P | 100.00 | 100.00 | 100.00 | 100.00 | 100.00 | 100.00 | 100.00 |
| Total (wt. parts) | 341.87 | 342.50 | 343.00 | 345.00 | 346.00 | 345.50 | 347.50 |
| Elastomer wt % | 29.25 | 29.20 | 29.15 | 28.99 | 28.90 | 28.94 | 28.78 |
| filler wt % | 48.26 | 48.18 | 48.10 | 47.83 | 47.69 | 47.76 | 47.48 |
| oil wt % | 19.01 | 18.98 | 18.95 | 18.84 | 18.79 | 18.81 | 18.71 |
| ML (dN * m) | 1.82 | 2.09 | 2.52 | 2.05 | 2.53 | 2.26 | 2.07 |
| MH (dN * m) | 7.55 | 11.62 | 17.16 | 19.34 | 23.72 | 23.73 | 27.65 |
| MH-ML (dN * m) | 5.73 | 9.53 | 14.64 | 17.29 | 21.19 | 21.47 | 25.58 |
| [(MH-ML)/T90%] (dN * m/min) | 0.45 | 1.32 | 1.99 | 1.76 | 3.72 | 3.25 | 2.65 |
| ts1 (min) | 0.60 | 0.34 | 0.33 | 0.34 | 0.24 | 0.27 | 0.29 |
| ts2 (min) | 1.10 | 0.47 | 0.45 | 0.46 | 0.32 | 0.35 | 0.38 |
| T10% (min) | 0.43 | 0.34 | 0.39 | 0.43 | 0.32 | 0.36 | 0.43 |
| T20% (min) | 0.66 | 0.46 | 0.56 | 0.66 | 0.47 | 0.54 | 0.69 |
| T50% (min) | 1.88 | 0.96 | 1.32 | 1.79 | 1.10 | 1.34 | 2.00 |
| T90% (min) | 12.78 | 7.23 | 7.37 | 9.82 | 5.69 | 6.61 | 9.67 |
| Hardness (Sh A) | 76 | 77 | 78 | 78 | 80 | 79 | 81 |
| TS (MPa)/TE (%) | 7.4/463 | 7.9/488 | 8.8/421 | 7.5/300 | 7.9/215 | 7.8/233 | 8.1/185 |

TABLE 4

Hydrosilylation Curing on Different Elastomers

| Composition | Inv. 19 | Inv. 20 | Inv. 21 | Inv. 22 | Inv. 23 |
|---|---|---|---|---|---|
| NORDEL 4760P | | | | | 100 |
| SVR3L (standard Vietnam Rubber) | | | | 100 | |

TABLE 4-continued

Hydrosilylation Curing on Different Elastomers

| Composition | Inv. 19 | Inv. 20 | Inv. 21 | Inv. 22 | Inv. 23 |
|---|---|---|---|---|---|
| BR9000 | 100 | | | | |
| NBR3370c | | 100 | | | |
| SBR1502 | | | 100 | | |

TABLE 4-continued

Hydrosilylation Curing on Different Elastomers

| Composition | Inv. 19 | Inv. 20 | Inv. 21 | Inv. 22 | Inv. 23 |
|---|---|---|---|---|---|
| Si—H-1 | 6 | 6 | 6 | 6 | 6 |
| Hydrosilylation catalyst | 0.2 | 0.2 | 0.2 | 1 | 0.2 |
| VN-3 (SiO2) | 5 | 5 | 5 | 5 | 5 |
| Total (wt. parts) | 111.2 | 111.2 | 111.2 | 111.2 | 111.2 |
| ML (dN*m) | 1.51 | 2.25 | 0.95 | 1.60 | 2.21 |
| MH (dN*m) | 16.68 | 13.91 | 9.00 | 8.99 | 22.71 |
| MH − ML (dN*m) | 15.17 | 11.66 | 8.05 | 7.39 | 20.50 |
| [(MH − ML)/T90%] (dN*m/min) | 1.86 | 3.19 | 0.93 | 2.04 | 1.36 |
| ts1 (min) | 0.17 | 0.2 | 0.35 | 0.63 | 0.4 |
| ts2 (min) | 0.24 | 0.25 | 0.5 | 0.85 | 0.59 |
| T10% (min) | 0.21 | 0.21 | 0.32 | 0.56 | 0.6 |
| T20% (min) | 0.32 | 0.26 | 0.43 | 0.73 | 1.05 |
| T50% (min) | 1.1 | 0.4 | 1.11 | 1.29 | 3.78 |
| T90% (min) | 8.18 | 3.65 | 8.69 | 3.63 | 15.13 |

Study 4—Continuous Vulcanization of Elastomers

Compound Mixing

Carbon black (N550) and calcium carbonate were dried at 120° C. for 12 hours, in a vacuum oven, prior to use. A typical "upside-down" mixing procedure was used to mix all compositions. For the inventive compositions (Inv. 24 and Inv. 25), the Si—H-1 compound and the hydrosilylation catalyst were premixed with the filler (carbon black and CaCO3) and oil for a better dispersion. The initial mixing temperature was 40° C., and this premix was mixed slowly at 10 RPM for 120 seconds, after which, the polymer and all other chemical components were added, and mixing was continued for another five minutes at 30 RPM. For the comparative composition (Comp. J), the initial mixing temperature was 40° C., and the filler and oil were mixed slowly at 10 RPM for 120 seconds, after which, the polymer and all other chemical components, except the sulfur, were added. Mixing was continued for another five minutes at 30 RPM, after which, the sulfur was added, and mixing was continued for another five minutes at 30 RPM.

For each inventive and comparative composition, the mixing continued for another five minutes, and then the composition, at about 90° C., was dumped onto a tray. The motor electrical current and composition temperature were recorded every 30 seconds. The fill factor was 0.80. Mixing was completed on a 6 inch, two-roll mill, and a "0.2" uncured, thick sheet" was sheeted out for rheology and mechanical testing. See ASTM D3182-5 (Standard Practice for Rubber-Materials, Equipment, and Procedures for Mixing Standard Compounds and Preparing Standard Vulcanized Sheets). The compositions are shown in Table 5.

Compression Molding and Curing

Each composition (uncured sheet) was compression molded and cured on a hot press for T90%+5 minutes at 185° C., 10 MPa, for a plaque (for the tensile test, compression set, odor test and density). Test specimens were die cut from the plaque.

TABLE 5

Formulations for Comparing Hydrosilylation-Cure with S-Cure on a CV Line

| Composition | Inv. 24 | Inv. 25 | Comp. J |
|---|---|---|---|
| NORDEL 4760P | | 100 | 100 |
| NORDEL 4770P | 100 | | |
| ZnO-80 | | | 6 |
| Stearic acid | | | 2 |
| PEG 4000 | 2 | 2 | 2 |
| Carbon black N-550 | 110 | 110 | 110 |
| Whitening (treated) CaCO3 | 55 | 55 | 55 |
| Paraffinic oil, SUNPAR 2280 | 65 | 65 | 65 |
| CaO-80 | 6 | 6 | 6 |
| CBS-80 | | | 0.75 |
| MBTS-80 | | | 1.5 |
| ZDBC-80 | | | 0.8 |
| ZDEC-80 | | | 0.5 |
| TETD-80 | | | 0.8 |
| DTDM-80 | | | 0.6 |
| S-80 | | | 2 |
| Si—H-1 | 4 | 4 | |
| Hydrosilylation catalyst | 1 | 1 | |
| TOTAL (wt. parts) | 343 | 343 | 352.95 |

Profile Extrusion and Continuous Vulcanization

The hydrosilylation cured of EPDM was examined on a continuous vulcanization (CV) line for making weatherstrip. Each profile extrusion and continuous vulcanization (CV) trial was carried out on a Lab Star line, which consisted of an extruder for profile extrusion, a shock oven for skin formation of sponge profiles, a microwave channel and hot air system for rubber vulcanization, and a cooling channel. The conditions for the extrusion and CV line are shown in Table 6. Note, the uncured sheet (see above) was hand cut into smaller sections (approx. 2 cm×5 mm) and fed into the extruder portion of the Lab Star line.

Mooney results and MDR results are shown in Tables 7 and 8, respectively. MDR results shows that the hydrosilylation cured compositions have slightly higher curing levels than the S-cured composition.

TABLE 6

Running Conditions of the Extrusion and CV Line

| | Sample | Inv. 24 | Inv. 25 | Comp. J |
|---|---|---|---|---|
| Extruder | Rotor speed/RPM | 30 | 50 | 50 |
| | Head Pressure/bar | 60 | 37 | 35 |
| | T1/° C. (Temp of Melt) | 110 | 118 | 110 |
| | T2/° C. (Temp of Screw) | 85 | 85 | 85 |
| | Torque/Nm | 250 | 102 | 100 |
| Shock Oven | Power % | 50 | 40 | 0 |
| Microwave | Power % | 50 | 50 | 50 |
| Hot Air | T-set/° C. | 200 | 200 | 200 |
| Belt | speed/m · min−1 | 1.8 | 1.6 | 1.3 |
| Cooling Tunnel | pick up speed/m · $min^{-1}$ | 2 | 1.8 | 1.3 |

TABLE 7

Mooney Viscosity

| Composition Mooney (MU) | Inv. 24 | Inv. 25 | Comp. J |
|---|---|---|---|
| ML 1 + 4 (MU) @ 100° C. | 79.57 | 73.08 | 67.65 |
| ML 1 + 4 + 2 (MU) | 3.65 | 2.55 | 2.29 |
| Relaxation Slope | −0.4399 | −0.4776 | −0.4937 |
| Relaxation Intercept | 27.98 | 23.53 | 23.05 |
| Mooney Relaxation Area (A) | 679.71 | 504.28 | 468.33 |
| MLRA/ML(1 + 4) | 8.5 | 6.9 | 6.9 |

TABLE 8

| MDR Results | | | |
|---|---|---|---|
| MDR Results | Inv. 24 | Inv. 25 | Comp. J |
| Test Condition (0.5 degree arc) | 15 min @ 180° C. | 15 min @ 180° C. | 15 min @ 180° C. |
| ML (dNm) | 2.26 | 1.90 | 1.59 |
| MH (dNm) | 17.20 | 16.85 | 14.96 |
| MH − ML (dNm) | 14.94 | 14.95 | 13.37 |
| ts1 (min) | 0.33 | 0.36 | 0.42 |
| ts2 (min) | 0.44 | 0.50 | 0.51 |
| tc10 (min) | 0.38 | 0.43 | 0.45 |
| tc50 (min) | 1.29 | 1.48 | 0.81 |
| tc90 (min) | 5.36 | 6.69 | 1.66 |

Mechanical properties are shown in Table 9. As seen in Table 9, for the compression molded samples, the S-cured EPDM composition has higher Tensile Strength (TS) and Elongation at Break (EB) properties than the hydrosilylation-cured EPDM compositions. However, for the CV samples, the mechanical results for the hydrosilylation-cured compositions were more comparable to those of the S-cured composition. Note, for the CV Cured Profiles in Table 9, the mechanical properties were determined using microtensile testing, in accordance with ASTM D1708-18, in the machine direction, with a traverse speed of 500 mm/min. A die cut microtensile test sample with a thickness from 1.8 to 2.8 mm was used.

TABLE 9

| Mechanical Properties | | | | | | |
|---|---|---|---|---|---|---|
| | Compression Molded Sheet | | | CV Cured Profile | | |
| Property | Inv. 24 | Inv. 25 | Comp. J | Inv. 24 | Inv. 25 | Comp. J |
| Density (g/cc)* | 1.234 | 1.218 | 1.239 | 1.207 | 1.178 | 1.063 |
| Hardness, Sh. A | 79 | 74 | 76 | 76 | 72 | 68 |
| E10(MPa) | 11.5 | 7.4 | 9.7 | 11.8 | 8.6 | 7.3 |
| E20(MPa) | 8.5 | 5.8 | 7.1 | 9.4 | 7.3 | 6.6 |
| E30(MPa) | 6.8 | 4.8 | 5.7 | 7.6 | 6.0 | 5.4 |
| E40(MPa) | 5.8 | 4.2 | 4.9 | 6.5 | 5.2 | 4.5 |
| E50(MPa) | 5.2 | 3.7 | 4.3 | 5.7 | 4.6 | 3.9 |
| E100(MPa) | 3.8 | 2.7 | 3.1 | 4.1 | 3.4 | 2.8 |
| E200(MPa) | 3.2 | 2.1 | 2.5 | 3.1 | 2.6 | 2.4 |
| TS (MPa) | 7.9 | 6.0 | 11.0 | 7.9 | 6.0 | 7.9 |
| EB (%) | 367 | 406 | 589 | 365 | 307 | 472 |

*Density was measured with a Mettler Toledo Balance using the Buoyancy Method. The sample was weighed in air (A) and then again (B) in an auxiliary liquid (water) with a known density. The density of the sample ρ was calculated as follows: $\rho = A(\rho_0 - \rho_L)/(A - B) + \rho_L$, where ρ = density of the sample, A = weight of the sample in air, B = weight of the sample in the auxiliary liquid, $\rho_0$ = density of the auxiliary liquid, $\rho_L$ = density of air.

Aging properties are shown in Table 10. Table 10 demonstrates that at elevated temperature, the hydrosilylation-cured EPDM compositions (Inv. 24 and Inv. 25) have better aging performance than S-cured EPDM composition (Comp. J). Overall, the inventive compositions have smaller degrees of change, upon aging, in terms of Hardness, 100% Modulus, TS, EB and density. Test samples were aged in an air circulating (convection) oven, which was equilibrated to the noted temperature and for the noted days, each listed in Table 10.

TABLE 10

| Aging Properties | | | | | | | | | | |
|---|---|---|---|---|---|---|---|---|---|---|
| | | 3d@125° C. aging | | | 7d@ 125° C. aging | | | 3d@ 150° C. aging | | |
| | Compression Molded Sheet | Inv. 24 | Inv. 25 | Comp. J | Inv. 24 | Inv. 25 | Comp. J | Inv. 24 | Inv. 25 | Comp. J |
| Property | Hardness (Shore A) | 79 | 74 | 81.6 | 81.7 | 76.5 | 84 | 82 | 77.9 | 84.5 |
| | 100% Modulus (MPa) | 4.2 | 2.6 | 6.6 | 4.6 | 3.3 | 8.1 | 4.7 | 3.5 | 7.5 |
| | TS(MPa) | 8.0 | 5.5 | 11.6 | 8.2 | 6.0 | 11.9 | 8.6 | 6.5 | 12.1 |
| | EB(%) | 283 | 367 | 221 | 279 | 274 | 178 | 291 | 297 | 193 |
| | Density (g/cc) | 1.234 | 1.219 | 1.245 | 1.229 | 1.216 | 1.234 | 1.237 | 1.218 | 1.248 |
| Change | ΔHardness (pts) | −0.3 | 0 | 5.6 | 2.4 | 2.5 | 8 | 2.7 | 3.9 | 8.5 |
| | Δ100% Modulus (%) | 9.1 | −4.9 | 105.3 | 19.5 | 21.3 | 151.9 | 21.8 | 31.0 | 132.8 |
| | ΔTS(%) | 0.4 | −7.2 | 5.6 | 3.3 | −0.2 | 8.4 | 8.1 | 9.6 | 10.2 |
| | ΔEB(%) | −22.9 | −9.6 | −61.0 | −24.0 | −32.5 | −68.6 | −20.7 | −26.8 | −65.9 |
| | ΔDensity (%) | 0 | 0.08 | 0.48 | −0.41 | −0.16 | −0.40 | 0.24 | 0.00 | 0.73 |

Compression set values are shown in Table 11. As seen, the inventive compositions have lower compression set values at higher temperature, which is a good feature for weather-strip applications.

TABLE 11

| Compression Set | |
|---|---|
| Composition | 168 hours at 70° C. |
| 4770-Si—H (Inv. 24) | 17.1% |
| 4760-Si—H (Inv. 25) | 16.4% |
| 4760-S (Comp. J) | 32.9% |

Odor properties are shown in Table 12. The hydrosilylation-cured EPDM composition (Inv. 24) showed a significant improvement in odor properties, compared to the S-cured EPDM composition (Comp. J). This improvement was indicated by both the odor intensity rating, as well as the hedonic rating. It was discovered that the hydrosilylation reaction does not generate a significant amount of undesired by products that increase odor. In addition, the silicone-hydride species and the hydrosilylation catalyst are odorless.

TABLE 12

| Odor Test* | | |
|---|---|---|
| Composition | Odor Intensity Rating $^a$ | Hedonic Rating $^b$ |
| 4770-Si—H (Inv. 24) | 3.54 B | 3.50A |
| 4760-S (Comp. J) | 4.75 A | 1.86 B |

*Note:
For the 15 panelists, if ≥12 panelists choose the same sample as the "least intense," this sample is considered statistically different from the other sample. A significant difference was observed between the two compositions (Inv. 24 and Comp. J) by the following rating evaluations.

[a]1 = not perceptible; 2 = perceptible, not disturbing; 3 = clearly perceptible, not disturbing; 4 = disturbing; 5 = strongly disturbing; 6 = not acceptable. The average of the numbers is reported in Table 12.

[b]1 = dislike extremely; 2 = dislike very; 3 = dislike moderately; 4 = dislike slightly; 5 = neither like nor dislike; 6 = like slightly; 7 = like moderately; 8 = like very; 9 = like extremely. The average of the numbers is reported in Table 12.

Study 5—Polybutadiene and Cure Coagents on Hydrosilylation Cure

For Study 5, two low molecular weight polybutadienes were added to several compositions, and the cure properties were examined. Results are shown in Table 13. As seen in Table 13, the compositions containing a polybutadiene had improved cure rates, as indicated, overall, by a decrease in T10%, T20% T50% and T90%, as compared to a control composition (control 1). The curing level (MH-ML) remained high in the inventive compositions containing the RICON 130 polybutadiene.

Table 14 shows cure properties for an inventive composition containing RICON 130 (Inv. 27) and the comparative industry composition (Comp. I). As seen in this table, the inventive composition had a higher curing level (indicated by a higher "MH-ML" value) and a faster curing rate (indicated, for example, by lower T10%, T20% T50% and T90% values) as compared to the comparative industry composition.

TABLE 13

Comparison of Polybutadiene with Other Coagents for Hydrosilylation-Cured EPDM.

| Composition | Control 1 | Inv. 26 | Inv. 27 | Inv. 28 | Inv. 29' | Inv. 30' | Inv. 31' | Inv. 32' | Inv. 33' | Inv. 34' | Inv. 35' |
|---|---|---|---|---|---|---|---|---|---|---|---|
| Whitening (CaCO3) | 60.00 | 60.00 | 60.00 | 60.00 | 60.00 | 60.00 | 60.00 | 60.00 | 60.00 | 60.00 | 60.00 |
| Carbon Black N550 | 180.00 | 180.00 | 180.00 | 180.00 | 180.00 | 180.00 | 180.00 | 180.00 | 180.00 | 180.00 | 180.00 |
| Paraffinic oil, SUNPAR 2280 | 115.00 | 115.00 | 115.00 | 115.00 | 115.00 | 115.00 | 115.00 | 115.00 | 115.00 | 115.00 | 115.00 |
| PEG 4000 | 2.00 | 2.00 | 2.00 | 2.00 | 2.00 | 2.00 | 2.00 | 2.00 | 2.00 | 2.00 | 2.00 |
| CaO-80 | 6.00 | 6.00 | 6.00 | 6.00 | 6.00 | 6.00 | 6.00 | 6.00 | 6.00 | 6.00 | 6.00 |
| NORDEL 4760 | 100.00 | 100.00 | 100.00 | 100.00 | 100.00 | 100.00 | 100.00 | 100.00 | 100.00 | 100.00 | 100.00 |
| Si—H-1 | 8.00 | 8.00 | 8.00 | 8.00 | 8.00 | 8.00 | 8.00 | 8.00 | 8.00 | 8.00 | 8.00 |
| RICON 130 | | 2.00 | 5.00 | 8.00 | | | | | | | |
| NISSO PB B-1000 | | | | | 2.00 | 5.00 | 8.00 | | | | |
| TAIC | | | | | | | | 5.00 | | | |
| TRIM | | | | | | | | | 5.00 | | |
| vi-d4 | | | | | | | | | | 5.00 | |
| Multi-vinyl siloxane | | | | | | | | | | | 5.00 |
| Hydrosilylation catalyst | 2.50 | 2.50 | 2.50 | 2.50 | 2.50 | 2.50 | 2.50 | 2.50 | 2.50 | 2.50 | 2.50 |
| Total (wt. parts) | 473.50 | 475.50 | 478.50 | 481.50 | 475.50 | 478.50 | 481.50 | 478.50 | 478.50 | 478.50 | 478.50 |
| Elastomer wt % | 21.12 | 21.03 | 20.90 | 20.77 | 21.03 | 20.90 | 20.77 | 20.90 | 20.90 | 20.90 | 20.90 |
| filler wt % | 50.69 | 50.47 | 50.16 | 49.84 | 50.47 | 50.16 | 49.84 | 50.16 | 50.16 | 50.16 | 50.16 |
| oil wt % | 24.29 | 24.19 | 24.03 | 23.88 | 24.19 | 24.03 | 23.88 | 24.03 | 24.03 | 24.03 | 24.03 |
| ML (dN*m) | 2.19 | 2.52 | 3.69 | 4.08 | 2.25 | 2.16 | 2.37 | 1.99 | 2.38 | 2.92 | 2.10 |
| MH (dN*m) | 13.75 | 13.41 | 17.21 | 12.87 | 5.51 | 4.71 | 5.98 | 4.99 | 9.18 | 3.87 | 4.84 |
| MH-ML (dN*m) | 11.56 | 10.89 | 13.52 | 8.79 | 3.26 | 2.55 | 3.61 | 3.00 | 6.80 | 0.95 | 2.74 |
| [(MH-ML)/T90%] (dN*m/min) | 1.64 | 2.09 | 15.19 | 21.98 | 5.02 | 4.55 | 7.22 | 5.00 | 17.44 | 2.26 | 0.29 |
| TS1 (min) | 0.27 | 0.14 | 0.11 | 0.10 | 0.22 | 0.27 | 0.22 | 0.21 | 0.14 | na | 0.45 |
| TS2 (min) | 0.37 | 0.20 | 0.15 | 0.13 | 0.34 | 0.44 | 0.30 | 0.35 | 0.18 | na | 1.26 |
| T10% (min) | 0.28 | 0.15 | 0.12 | 0.10 | 0.16 | 0.17 | 0.16 | 0.14 | 0.13 | 0.13 | 0.22 |
| T20% (min) | 0.40 | 0.21 | 0.17 | 0.12 | 0.19 | 0.21 | 0.19 | 0.17 | 0.15 | 0.15 | 0.30 |
| T50% (min) | 0.90 | 0.54 | 0.34 | 0.19 | 0.28 | 0.31 | 0.28 | 0.26 | 0.23 | 0.23 | 0.62 |
| T90% % (min) | 7.05 | 5.20 | 0.89 | 0.40 | 0.65 | 0.56 | 0.50 | 0.60 | 0.39 | 0.42 | 9.50 |

MDR: 20 minutes at 185° C.

TABLE 14

Comparison of Curing Rate and Curing Level of Polybutadiene Modified Hydrosilylation-Cured EPDM vs. Sulfur-Cured EPDM.

| Composition | S cured (Comp. I) | Si—H cured (Inv. 27) |
|---|---|---|
| NORDEL 4760 | 100.00 | 100 |
| ZnO-80 | 6.00 | |
| Stearic acid | 2.00 | |
| PEG 4000 | 2.00 | 2.00 |
| Carbon black N-550 | 180.00 | 180.00 |
| CaCO3 Whitening | 60.00 | 60.00 |
| Paraffinic oil, SUNPAR 2280 | 115.00 | 115.00 |
| CaO-80 | 6.00 | 6.00 |
| CBS-80 | 0.75 | |
| MBTS-75 | 1.50 | |
| ZDBC-80 | 0.80 | |
| ZDEC-80 | 0.50 | |
| TETD-75 | 0.80 | |
| DTDM-80 | 0.60 | |
| S-80 | 2.00 | |
| Si—H-1 | | 8.00 |
| Hydrosilylation catalyst | | 2.50 |
| RICON 130 | | 5.00 |
| Total (wt. parts) | 477.95 | 478.50 |
| Elastomer (wt %) | 20.92 | 20.90 |
| Filler (wt %) | 50.21 | 50.16 |
| Oil (wt %) | 24.06 | 24.03 |
| ML (dN*m) | 1.49 | 3.69 |
| MH (dN*m) | 11.95 | 17.21 |
| MH − ML (dN*m) | 10.46 | 13.52 |
| [(MH − ML)/T90%] (dN*m/min) | 7.69 | 15.19 |
| ts1 (min) | 0.35 | 0.11 |
| ts2 (min) | 0.43 | 0.15 |
| T10% (min) | 0.36 | 0.12 |
| T20% (min) | 0.44 | 0.17 |
| T50% (min) | 0.62 | 0.34 |
| T90% % (min) | 1.36 | 0.89 |

MDR: 20 minutes at 185° C.

The invention claimed is:

1. A process for of forming a crosslinked composition, said process comprising thermally treating a composition comprising the following components:

a) an elastomer;

b) a siloxy-modified silica;

c) a hydrosilylation catalyst, and wherein the siloxy portion of the siloxy-modified silica comprises ≥4 units of the following Structure 1:

∿∿∿ O—Si($R^1$)($R^2$)H (Structure 1), where $R^1$ is a hydrocarbyl group, and $R^2$ is a hydrocarbyl group, and $R^1$ and $R^2$ may be the same or different, wherein the siloxy-modified silica has a viscosity ≤500 cSt at 25° C.; and wherein the silica portion of the siloxy-modified silica is derived from a silica Q resin.

2. The process of claim 1, wherein the elastomer is selected from the group consisting of the following: i) an ethylene/alpha-olefin/nonconjugated polyene interpolymer, ii) a polyisoprene, iii) a polybutadiene, iv) a styrene butadiene rubber, v) a nitrile rubber, vi) a polychloroprene, vii) a butyl rubber, viii) a halogenated butyl rubber, and ix) a halogenated nitrile rubber.

3. The process of claim 1, wherein the siloxy-modified silica has a viscosity, at 25° C., from 0.5 cSt to 200 cSt.

4. The process of claim 1, wherein the hydrosilylation catalyst comprises Pt, Pd, Rh, Re, Ir, Ru, or a mixture thereof.

5. The process of claim 1, wherein the composition further comprises a polybutadiene.

6. The process of claim 5, wherein the polybutadiene comprises ≤50 mol % of 1,2-vinyl content, based on the total moles of carbon-carbon double bond groups in the polybutadiene.

7. The process of claim 1, wherein the elastomer is an ethylene/alpha-olefin/nonconjugated polyene interpolymer.

8. The process of claim 7, wherein the nonconjugated polyene of the interpolymer is 5-ethylene-2-norbornene (ENB).

9. The process of claim 1, wherein the composition is thermally treated at a temperature from 90° C. to 220° C.

10. A crosslinked composition comprising the following components:

a) an elastomer;

b) a siloxy-modified silica;

c) a hydrosilylation catalyst, and wherein the siloxy portion of the siloxy-modified silica comprises ≥4 units of the following Structure 1:

∿∿∿ O—S($R^1$)($R^2$)H (Structure 1), where $R^1$ is a hydrocarbyl group, and $R^2$ is a hydrocarbyl group, and $R^1$ and $R^2$ may be the same or different, wherein the siloxy-modified silica has a viscosity ≤500 cSt at 25° C.; and wherein the silica portion of the siloxy-modified silica is derived from a silica Q resin.

11. The composition of claim 10, wherein the elastomer is selected from the following: i) an ethylene/alpha-olefin/nonconjugated polyene interpolymer; ii) a polyisoprene, iii) a polybutadiene, iv) a styrene butadiene rubber, v) a nitrile rubber, vi) a polychloroprene, vii) a butyl rubber, viii) a halogenated butyl rubber, and ix) a halogenated nitrile rubber.

12. The composition of claim 10, wherein the elastomer is an ethylene/alpha-olefin/nonconjugated polyene interpolymer.

13. The composition of claim 12, wherein the nonconjugated polyene of the interpolymer is 5-ethylene-2-norbornene (ENB).

14. An article comprising at least one component formed from the composition of claim 10.

15. The process of claim 1, wherein for Structure 1, $R^1$ is an alkyl, and $R^2$ is an alkyl.

16. The process of claim 1, wherein the weight ratio of component b to component c is from 1.5 to 4.5.

* * * * *